United States Patent [19]

Kosugi et al.

[11] Patent Number: 5,706,280

[45] Date of Patent: Jan. 6, 1998

[54] TRANSMISSION QUALITY MONITORING SYSTEM FOR A DIGITAL COMMUNICATION NETWORK

[75] Inventors: Toru Kosugi, Oyama; Yoshitaka Taki, Kawasaki, both of Japan

[73] Assignee: Fujitsu Limited, Kanagawa, Japan

[21] Appl. No.: 507,876

[22] Filed: Jul. 27, 1995

[30] Foreign Application Priority Data

Sep. 6, 1994 [JP] Japan .................................. 6-212573

[51] Int. Cl.⁶ .............................. H04T 3/14; H04L 12/26
[52] U.S. Cl. ........................ 370/244; 370/249; 370/251; 370/252; 370/410; 370/473; 370/510; 370/524; 370/528; 340/825.14; 371/20.5; 379/5; 379/230; 395/185.03
[58] Field of Search ....................... 370/13, 17, 15, 370/82, 105, 105.1, 105.4, 110.1, 110.4, 111, 112, 85.6, 941, 94.2, 249–52, 465, 470–473, 476, 503, 509, 510, 512, 522, 524, 528; 340/825.06, 825.14, 825.16, 825.17, 825.5, 825.51, 184.01, 185.01, 185.02, 185.03, 185.04; 395/184.01, 185.01, 185.02, 185.03, 185.04; 375/224, 228; 379/1–29, 229, 230; 371/20.1, 20.4, 20.5

[56] References Cited

U.S. PATENT DOCUMENTS

| | | | |
|---|---|---|---|
| 4,989,202 | 1/1991 | Soto et al. | 370/13 |
| 5,063,564 | 11/1991 | Crandall et al. | 370/105.1 |
| 5,099,480 | 3/1992 | Murata | 370/13 |
| 5,513,173 | 4/1996 | Machemer et al. | 370/17 |

FOREIGN PATENT DOCUMENTS

| | | |
|---|---|---|
| 61-94426 | 5/1986 | Japan . |
| 5-268342 | 10/1993 | Japan . |

OTHER PUBLICATIONS

Digital Cross–Connect System Requirements and Objectives, Technical Reference TR–TSY–00170 Issue 1, Nov. 1985.

*Primary Examiner*—Alpus H. Hsu
*Assistant Examiner*—Seema S. Rao
*Attorney, Agent, or Firm*—Helfgott & Karas, P.C.

[57] ABSTRACT

A digital communication network has a first end office which includes a first multiplexer unit and a second end office which includes a second multiplexer unit. The network performs transmission and reception of multiplexed signals between the first end office and the second end office. A monitor unit is provided within the first end office. Monitoring is performed of the accuracy of the signal received by the second end office from the first end office, signal accuracy information with regard to the received signal being included as subsignalling information in the input signal Sin which is input to the first end office from the second end office. The subsignalling information is extracted by the monitor unit from the input signal, so as to enable monitoring of the signal accuracy of the input signal. The result is a significant improvement in the improvement of transmission quality monitoring service provided in the digital communication network.

10 Claims, 20 Drawing Sheets

Fig. 5

| FRAME NUMBER OF MULTIFRAME | BIT POSITION IN MULTIFRAME | F BIT | | |
|---|---|---|---|---|
| | | ASSIGNMENT | | |
| | | FRAME SYNCHRONIZATION PATTERN | DATA LINK | ERROR CHECK CRC6 |
| 1 | 1 | | m | |
| 2 | 194 | | | e1 |
| 3 | 387 | | m | |
| 4 | 580 | 0 | | |
| 5 | 773 | | m | |
| 6 | 966 | | | e2 |
| 7 | 1159 | | m | |
| 8 | 1352 | 0 | | |
| 9 | 1545 | | m | |
| 10 | 1738 | | | e3 |
| 11 | 1931 | | m | |
| 12 | 2124 | 1 | | |
| 13 | 2317 | | m | |
| 14 | 2510 | | | e4 |
| 15 | 2703 | | m | |
| 16 | 2896 | 0 | | |
| 17 | 3089 | | m | |
| 18 | 3282 | | | e5 |
| 19 | 3475 | | m | |
| 20 | 3668 | 1 | | |
| 21 | 3861 | | m | |
| 22 | 4054 | | | e6 |
| 23 | 4247 | | m | |
| 24 | 4440 | 1 | | |

Fig. 6

| FRAME No. | DATA | REMARK |
|---|---|---|
| 0 | 11111111 | DATA CHANGING FLAG |
| 1 | 01111110 | LAPD START FLAG |
| 2 | --- | Don't Care |
| 3 | --- | |
| 4 | --- | |
| 5 | G3,-,G4,-,-,G5,-,G6 | t0 DATA (PRESENT DATA) |
| 6 | -,-,G1,-,G2,-,-,- | |
| 7 | G3,-,G4,-,-,G5,-,G6 | t1 DATA (DATA OF 1 SECOND AGO) |
| 8 | -,-,G1,-,G2,-,-,- | |
| 9 | G3,-,G4,-,-,G5,-,G6 | t2 DATA (DATA OF 2 SECONDS AGO) |
| 10 | -,-,G1,-,G2,-,-,- | |
| 11 | G3,-,G4,-,-,G5,-,G6 | t3 DATA (DATA OF 3 SECONDS AGO) |
| 12 | -,-,G1,-,G2,-,-,- | |
| 13 | FCS (CRC-16 FRAME CHECK) | VARIABLE |
| 14 | | |

ONE-SECOND REPORT: frames 5–12

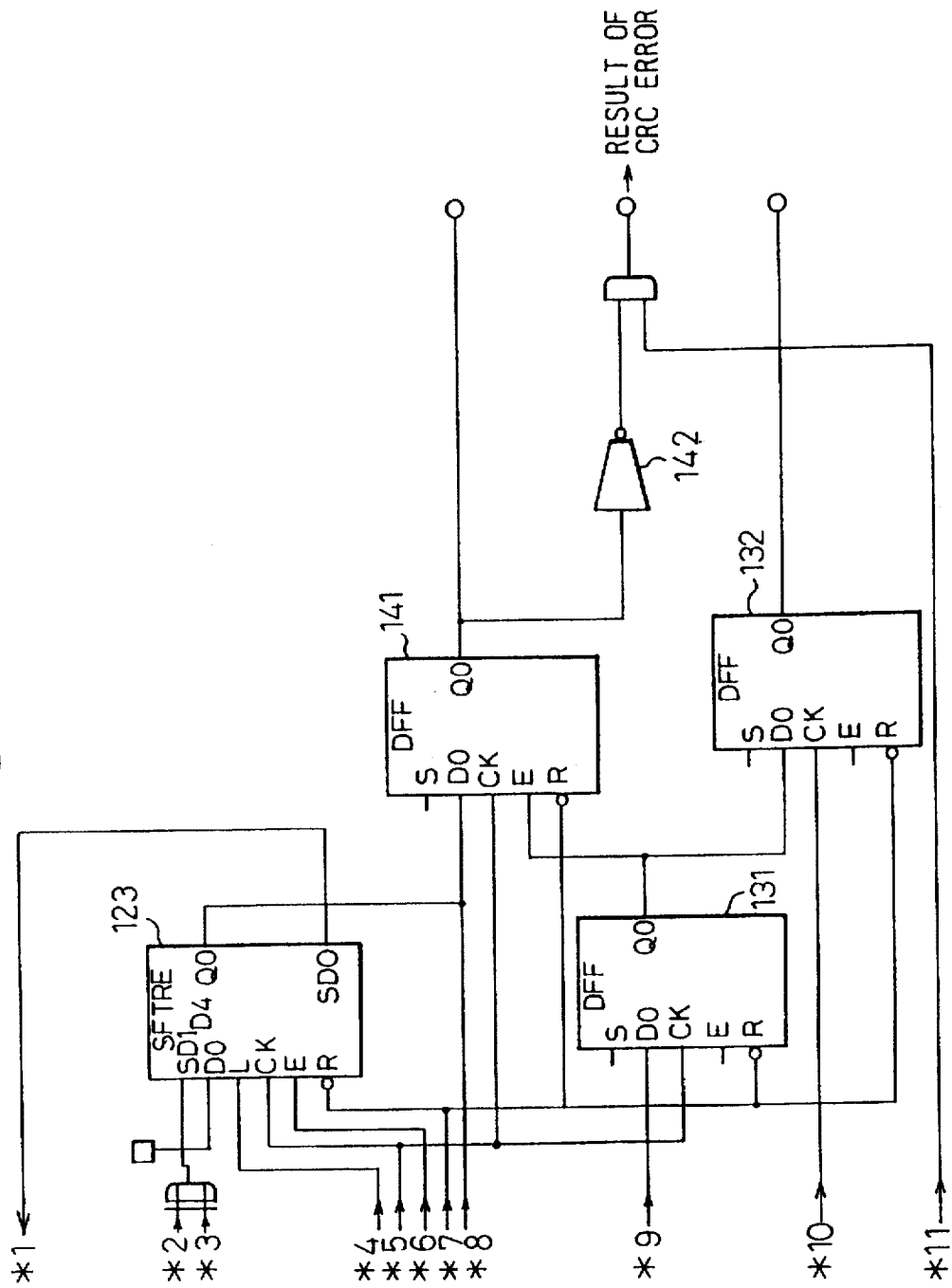

TRANSMISSION QUALITY MONITORING SYSTEM FOR A DIGITAL COMMUNICATION NETWORK

BACKGROUND OF THE INVENTION

1. Field of the Invention

The present invention relates to a transmission quality monitoring system in a digital communication network, such as for the a transmission quality monitoring system suitable for application to the monitoring of the transmission quality of received multiplexed signals such as SONET (Synchronous Optical NETwork), which is synchronous digital communication network of the type used in North America.

In recent years, in North America and other areas of the world, diversification of the content of communications, as typified by such applications as multimedia, on the increase. Along with the promotion of such diversification, there is a strong desire to assure the transmission quality of the digital communication network itself, which supports such diversified communication.

With the above as backdrop, the present invention provides a method of achieving a further improvement in the assurance of transmission quality.

2. Description of the Related Art

As will be shown by drawings later, a digital communication system to which the present invention is applied (for example, SONET) has a first end office which includes a first multiplexer unit and a second end office which includes a second multiplexer unit, and performs transmission and reception of multiplexed signals between the first end office and the second end office. In such a digital communication network, in the past, monitoring of the accuracy of the signal was performed to the received signal at the above-noted second end office at one subscriber, this signal accuracy information being included as subsignalling information in the main signal from the second end office, this being transmitted to the second end office at a subscriber at the other end, at the second end office of which this subsignalling information is extracted to perform monitoring of transmission quality. In this case, the above-noted first end office executes a function which further multiplexes the signal multiplexed at the second end office to produce signals of a higher order.

In a transmission quality monitoring system of the past as described above, the above-noted subsignalling information which is inserted at the second end office of one subscriber into the main signal to the other subscriber, that is the signal accuracy monitoring information is only used at the above-noted other end subscriber.

For this reason, it was only possible to perform point-to-point monitoring, i.e., coarse monitoring from one end to the other of a long transmission line.

As a result, it was not possible to satisfy the desire to monitor the information relating to signal accuracy not only at the receiving end, but also at the transmitting end, to provide further detailed control of the transmission quality in this digital communication network.

SUMMARY OF THE INVENTION

In consideration of the above-noted situation, the present invention has as an object the enabling of extraction of subsignalling information at the transmitting side of the main signal as well which contains therein the subsignalling information related to signal accuracy.

To attain the above-noted object, in a digital communication network which has a first end office which includes a first multiplexer unit and a second end office which includes a second multiplexer unit, and which performs transmission and reception of multiplexed signals between the first end office and the second end office, a monitor means is provided within the first end office. At the second end office, monitoring is performed of the signal accuracy with respect to the signal received from the first end office, this signal accuracy information being extracted from the input signal Sin, by means of the above-noted monitor means, which is input from the second end office to the first end office and signal Sin includes this signal accuracy information as subsignalling information. By doing this, it becomes possible to monitor the signal accuracy of the input signal Sin even at the first end office. In this manner, there is a significant improvement in the service of monitoring the transmission quality in a digital communication network.

BRIEF DESCRIPTION OF THE DRAWINGS

The above object and features of the present invention will be more apparent from the following description of the preferred embodiments, with reference being made to the accompanying drawings, wherein:

FIG. 5 is a drawing which illustrates the F bit assignments in FIG. 4;

FIG. 6 is a drawing which shows an example of a known LAPD format;

FIG. 20 is a second drawing which shows an example of the circuits that actually comprise the error detection unit.

DESCRIPTION OF THE PREFERRED EMBODIMENT

The embodiments of the present invention will be described next, with reference being made to the related drawings.

Figure 1:
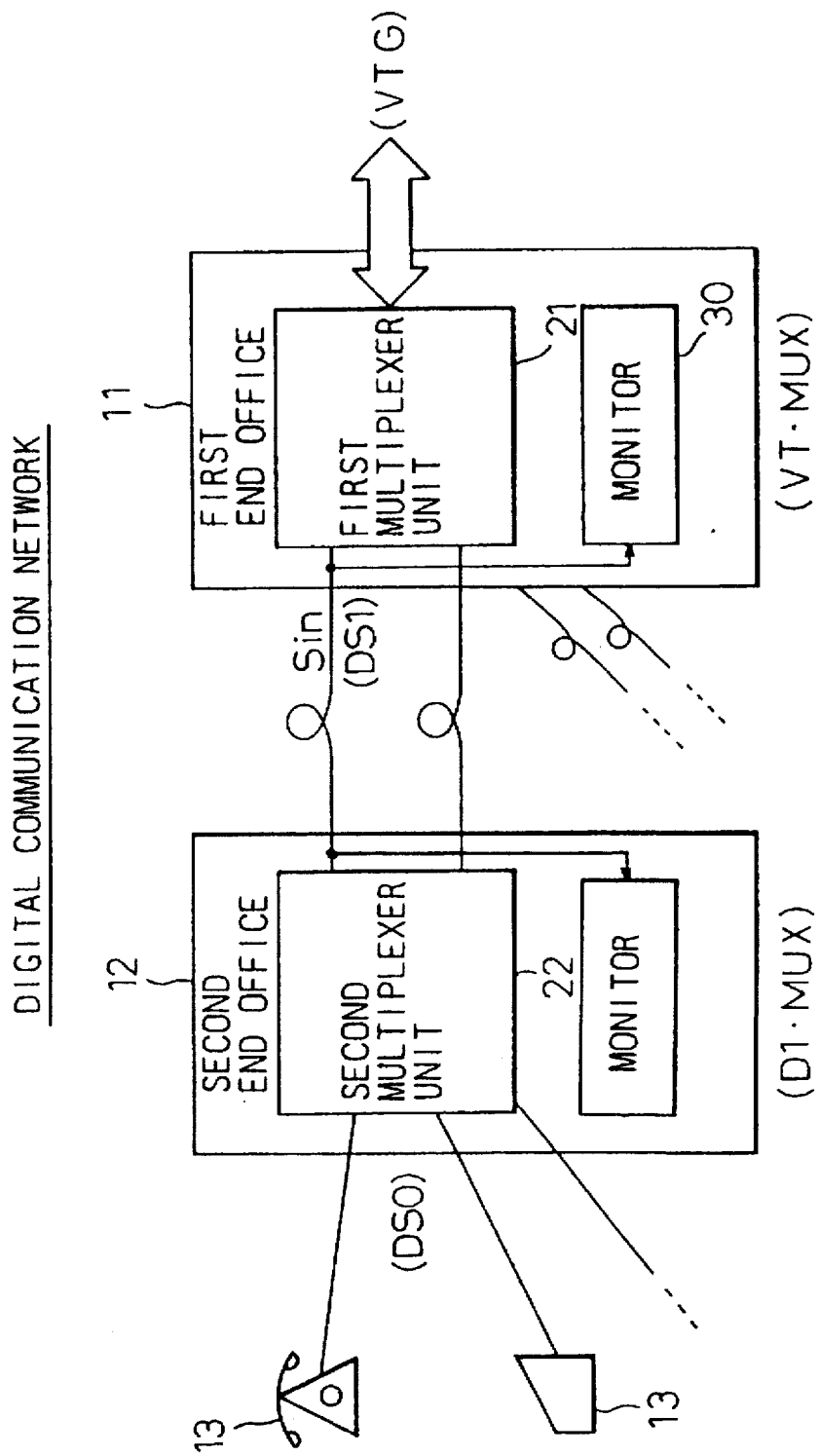
FIG. 1 is a drawing which shows a general view of a transmission quality monitoring system according to the present invention.

FIG. 1 is a drawing which shows the general configuration of a transmission monitoring system according to the present invention. As shown in this drawing, a digital communication network to which the present invention is applied has a first end office 11 which includes a first multiplexer unit 21 and a second end office 12 which includes a second multiplexer unit 22, and which performs transmission and reception of multiplexed signals between the first end office and the second end office.

In a first aspect of the present invention, as shown in FIG. 1, a monitor means 30 is provided within the first end office 11. Monitoring of the signal accuracy with respect to a signal received from the first end office 11 is performed at the second end office 12, this signal accuracy information being included as subsignalling information, which is extracted by the monitor means 30 from the input signal input from the second end office 12 to the first end office 11, thereby enabling monitoring of the signal accuracy information for the above-noted input signal at the first end office 11 as well.

In a second aspect of the present invention, the above-noted subsignalling information is information which is periodically inserted in them in signal information which is to be communicated between the first end office 11 and the second end office 12, and the monitor means 30 includes a main synchronizing unit (31) which establishes synchronization with the main signal, and a sub-synchronizing unit (32) which establishes synchronization with the above-noted subsignalling information after synchronization is established with the above-noted main signal information, this monitor means 30 performing synchronous extraction of the above-noted subsignalling information.

In a third aspect of the present invention, the above-noted subsignalling information consists of various types of transmission quality monitoring data which are mapped in a prescribed data format, and the monitor means 30 includes a timing generation unit (33) which generates timing signals for the purpose of individually extracting the various transmission quality monitoring data from the various transmission quality data included in the above-noted data format, monitoring of the input signal received by the first end office 11 from the second end office 12 being performed according to the extracted transmission quality monitoring data.

In a fourth aspect of the present invention, the above-noted main signal information is composed of multiframes according to ESF (Extended Super Frame), the above-noted subsignalling information being composed of a data link which is formed by collecting bits which are assigned to each frame which makes up the above-noted multiframe, and the above-noted data format which comprises the above-noted subsignalling information being the LAPD (Link Access Procedure of the D-channel) format which is comprised of the bit groups which make up the data link, the sub-synchronizing unit (32) detecting the head pattern of this LAPD format, so as to establish synchronization of the LAPD format.

In a fifth aspect of the present invention, the timing generation unit (33), based on the above-noted generated timing signals, extracts the One-Second Report area which is mapped onto a prescribed location in the above-noted LAPD format, and further individually extracts various transmission quality monitoring data from within the One-Second Report area.

In a sixth aspect of the present invention, the monitor means 30 performs extraction and monitoring, as transmission quality monitoring data, of bits G1 through G6, which indicate error events within the One-Second Report area.

In a seventh aspect of the present invention, the monitor means 30 performs extraction and monitoring, as transmission quality monitoring data, of FCS (Frame Check Sequence) bits which are mapped within the LAPD format and outside the One-Second Report area.

In an eighth aspect of the present invention, the monitor means 30 extracts the bits G1 through G6 within the One-Second Report area as transmission quality monitoring data, and also extracts the above-noted FCS (Frame Check Sequence) bits which are mapped within the LAPD format and outside the One-Second Report area as transmission quality monitoring data, performing monitoring based on these data.

In a ninth aspect of the present invention, the timing generation unit (33) generates timing signals which extract only bits G1 through G6 which are mapped as t0 data which is current data within the One-Second Report area, and the monitor means 30 performs monitoring based on the bits G1 through G6 which correspond to the extracted t0 data.

In a tenth aspect of the present invention, four types of timing signals are generated, which individually extract four groups of bits G1 through G6 which are mapped as the above-noted t0 data, t1 data of one second ago, t2 data of two seconds ago, and t3 data of three seconds ago within the One-Second Report area, the monitor means 30 performing monitoring based on the extracted bits G1 through G6.

In an eleventh aspect of the present invention, the monitor means 30 includes an invalidity detection unit (34) which, when at least one of the following seven conditions condition 1, in which two or more logic 1s in total are included any of bits G1 through G6, condition 2, in which the LAPD format is not detected for a period of one second or longer, condition 3, in which the LAPD format is not retransmitted within one second after the input of an interrupt signal in the LAPD format, condition 4, in which either the input signal to the first end office 11 is suspended is detected or the AIS (Alarm Indication Signal) is detected from the input signal, condition 5, in which, from the input signal, out-of-synchronization is detected at the main synchronizing unit, condition 6, in which an FCS error is detected, and condition 7, in which a DS1 PATH YELLOW alarm, which indicates abnormality in the input signal, is detected from the data link, is satisfied, detects the satisfying of the condition or conditions, so that an abnormality in the input signal is monitored at the first end office 11.

In a twelfth aspect of the present invention, a priority decision unit (84), which, in the case in which all the four groups of bits G1 through G6 extracted individually as the above-noted t0 data, t1 data of one second ago, t2 data of two seconds ago, and t3 data of three seconds ago are not all the same, if bits G1 through G6 of each of two or more groups coincide, selects the coinciding bits G1 through G6 as the bits to be monitored, is provided within the monitor means 30, monitoring being performed based on the transmission quality monitoring data indicated by the thus selected bits G1 through G6.

In a thirteenth aspect of the present invention, a selector (91) is provided at the input side of the monitor means 30, this selector 91 performing selective changeover between the output signal sent from the first end office 11 to the second end office 12 and the input signal input from the second end office 12 to the first end office 11, as the signal to be input to the monitor means 30.

The effect of the present invention will be described next.

According to the first aspect of the present invention, accuracy information (subsignalling information) of the received signal which is output from the first end office 11 to the second end office 12 is extracted from the main signal information and monitored by the monitor means 30 of the first end office 11.

In the past, the monitoring of the multiplexed signals sent from the first end office 11 and the second end office 12 to the other end was not performed at the first end office and second end office. In the present invention, however, this is easy to do, it being possible to determine the transmission quality of at least the signal being passed between the second end office and the second end office.

According to the second aspect of the present invention, a basic circuit means is provided for the purpose of extracting subsignalling information which is inserted into the main signal information.

According to the third aspect of the present invention, subsignalling information is formed by various transmission quality monitoring data which are mapped in a prescribed format, a basic circuit means being provided for the purpose of individual extraction of these various transmission quality monitoring data.

According to the fourth aspect of the present invention, the known ESF format is used for the transmission of the main signal information. In addition, the known LAPD format is used as the method of placing the subsignalling information in a data link formed at a prescribed bit stream within this format.

According to the fifth aspect of the present invention, the so-called One-Second Report area within the LAPD format is used as the data to be monitored as transmission quality monitoring data.

According to the sixth aspect of the present invention, the bits from G1 to G6 (G1, G2, G3, G4, G5, and G6) in the One-Second Report area are the bits which are monitored as transmission quality monitoring data.

According to the seventh aspect of the present invention, the FCS bits are used as the transmission quality monitoring data.

According to the eighth aspect of the present invention, both the above-noted bits G1 to G6 and the FCS bits are used as the transmission quality monitoring data.

According to the ninth aspect of the present invention, only the bits G1 through G6 which correspond to the so-called t0 data are used as the above-noted G1 through G6. While there are also the t1 data, the t2 data, and the t3 data, by using only the t0 data it is possible to achieve a great reduction in the size of the associated hardware.

According to the tenth aspect of the present invention, all the G1 through G6 bits corresponding to the above-noted t0 through t4 data are used, and while this is accompanied by an increase in hardware, it enables high-accuracy monitoring.

According to the eleventh aspect of the present invention, invalidity information is selected as the transmission quality monitoring data, with examples of such invalidity information being at least the seven conditions presented above.

According to the twelfth aspect of the present invention, it is possible to cope with the situation in which there is not coincidence between all above-noted groups of G1 through G6 bits. If there is mutual coincidence between at least two groups of G1 to G6 bits, this is what is monitored, with coincidence being lost with other groups of G1 to G6 bits due to, for example, noise being ignored.

According to the thirteenth aspect of the present invention, monitoring is possible not only of the input signal input from the second end office 12 to the first end office 11, but also the received signal to be input from the first end office 11 to the second end office 12. By comparing the two monitoring results, it is possible to perform detailed analysis of the transmission quality.

Figure 2:
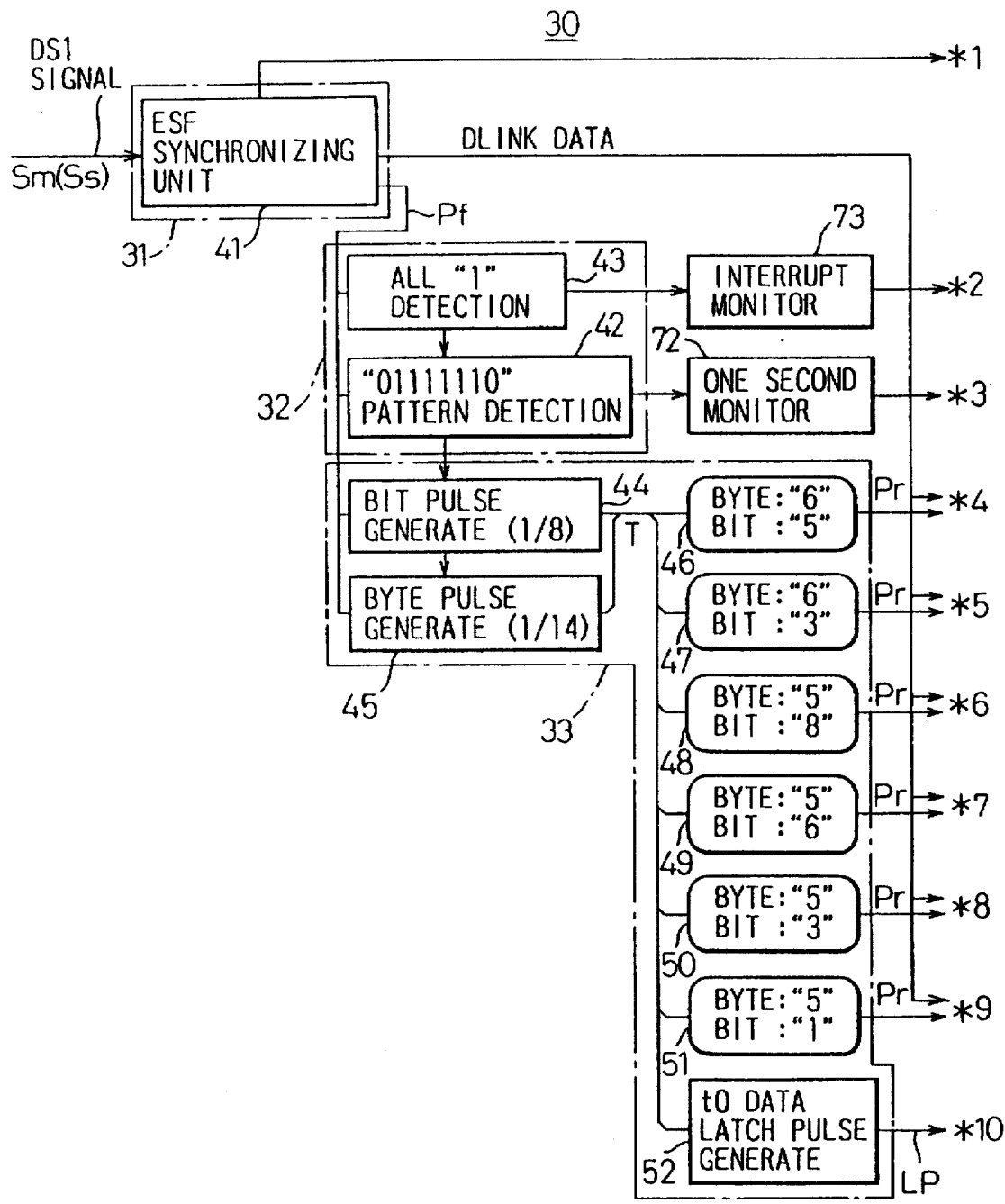
FIG. 2 is a first drawing which shows a first embodiment of a monitor means according to the present invention.
Figure 3:
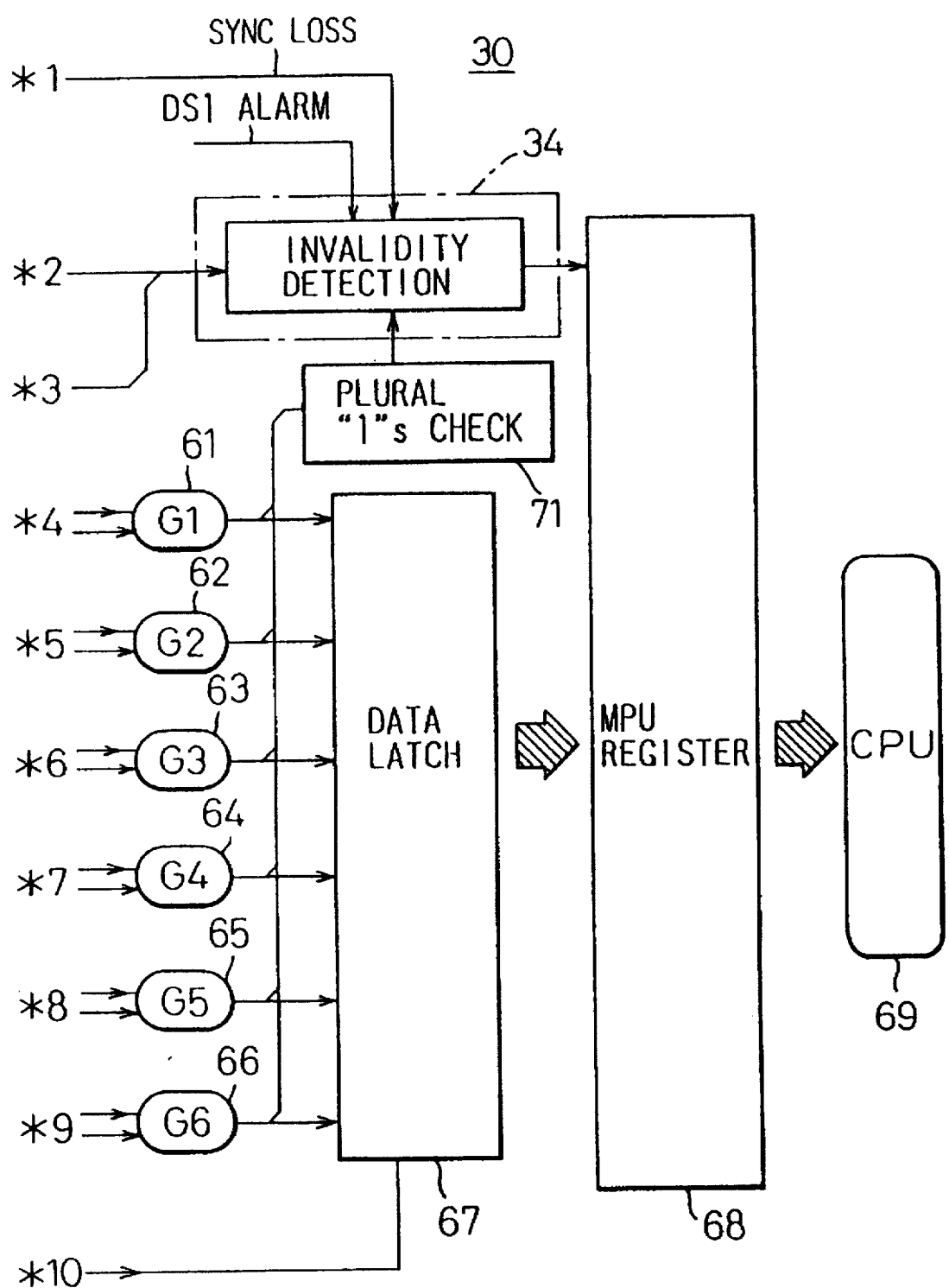
FIG. 3 is a second drawing which shows a first embodiment of a monitor means according to the present invention.

FIG. 2 is a first drawing and FIG. 3 is a second drawing which show the first embodiment of a monitor means according to the present invention. In the monitor means 30 which is shown in FIG. 2 and FIG. 3, the reference numeral 31 denotes a synchronizing unit which establishes synchronization with the main signal information Sm, 32 is a sub-synchronizing unit which establishes synchronization with above-noted subsignalling information Ss after synchronization is established with the above-noted main signal information Sm.

The reference number 33 denotes a timing generation unit which generates the timing signals T based on the synchronization signal from the sub-synchronizing unit 32. These timing signals are signals which are used to individually extract specified monitoring data from various transmission quality monitoring data (Ds, to be described later) which have been mapped in a prescribed format.

The reference numeral 34 in FIG. 3 denotes an invalidity detection unit, which monitors invalid information for a variety of abnormal transmission conditions and, when any invalidity condition is satisfied, extracts it.

The above-noted main signal information Sm, which includes the subsignalling information Ss, is the same as the input signal Sin in FIG. 1, which is input from the second end office 12 to the first end office 11. This input signal Sin is, for example as shown in FIG. 2, a DS1 signal (the 1.544-Mbps primary rate signals for the North American system). A further description will now be provided, using the example of this signal.

Referring again to FIG. 1, the first end office 11, to which the DS1 signal is input as the input signal Sin, can be for example, a VT MUX (virtual tributary multiplexer) in the SONET system. The second end office 12 which outputs this DS1 signal can be, for example, a D1 MUX (D1 (=DS1) multiplexer), this including a second multiplexer unit 22, which multiplexes the 0th order signal DS0 (64 Kbs) from an end subscriber 13 to the DS1 level.

The first multiplexer unit 21 multiplexes the above-noted DS1 signals to 6.9-Mbps VTG (Virtual Tributary Group) signals, this being transmitted to, for example, a 150-Mbps optical transmission line positioned at the right side of FIG. 1.

The above-described DS1 signal (main information signal Sm, which includes subsignalling information Ss) which serves as the input signal Sin is composed of, for example, multiframes in the known ESF (Extended Super Frame) format. This will be described, with reference made to FIG. 4.

Figure 4:
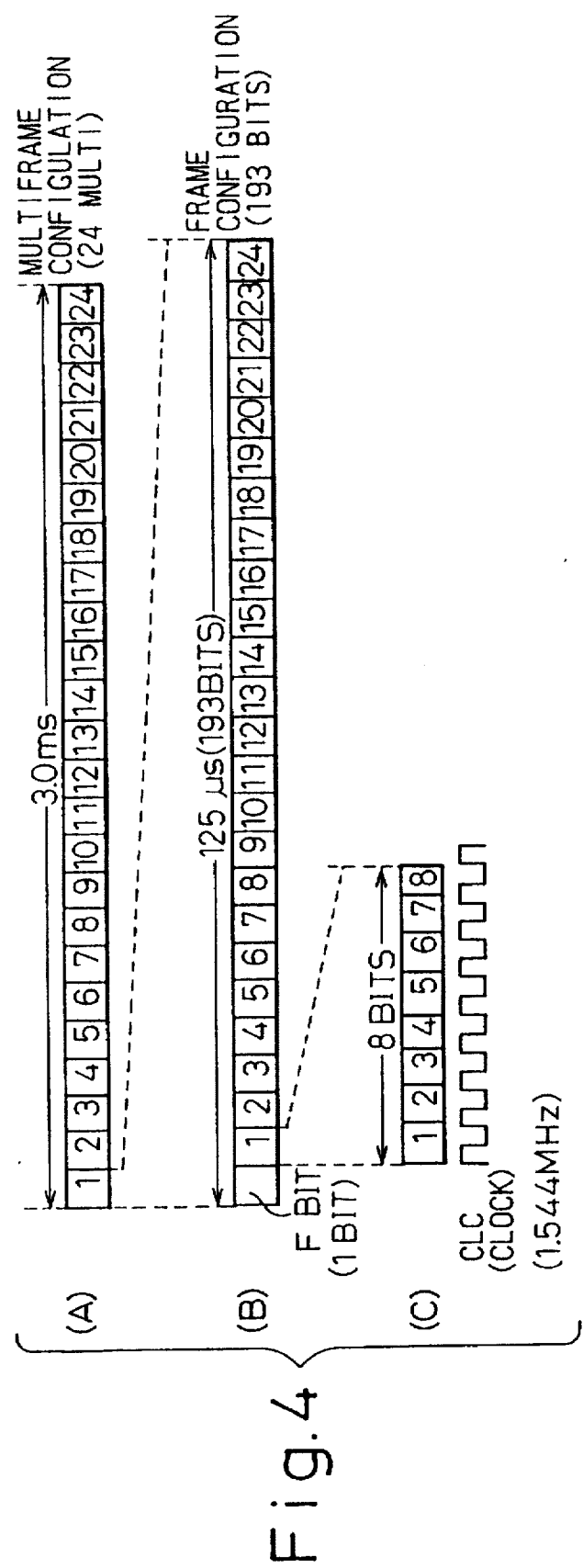
FIG. 4 is a drawing which illustrates the multiframe configuration according to ESF.

FIG. 4 is a drawing which illustrates the multiframe configuration according to ESF. In this drawing, part (C) shows the basic byte which forms the 1.544-Mbps DS1 signal and the clock CLC.

A series of 24 of these basic bytes makes up the 193-bit frame shown at (B), the length of this frame being 125 μs.

A series of 24 of these frames makes up a multiframe, which is shown at (A) (24 multiframe), the length of this multiframe being 3.0 ms (125 μs×24).

This 24 multiframe is the above-noted ESF. The 24 frames that make up this 24 multiframe each has an Fbit added to them. This Fbit is the basic bit which forms the subsignalling information. This will be described, with reference made to FIG. 5.

FIG. 5 is a drawing which illustrates the assignment of Fbits in FIG. 4. The left column of this drawing is labeled FRAME NUMBER OF MULTIFRAME, the frame numbers therein corresponding to the numbers 1, 2, 3, . . . , 24 of part (A) of FIG. 4. If the Fbits which are added to the head of each of these 24 frames are counted in bit units, as shown in the column BIT POSITION IN MULTIFRAME in FIG. 5, the bit positions of the Fbits, counting from the left end of (A) in FIG. 4, are the 1st bit, the 194th bit, the 387th bit, and so on up until the 4440th bit. These 24 Fbits have sequentially assigned to a frame synchronization pattern, m bits which form a data link, or e1, e2, . . . , e6, which indicate the results of a CRC6 error check.

If when monitoring the frame numbers 4, 8, 12, 16, 20, and 24 the logic states in this sequence are detected as "001011" this is the frame synchronization pattern, and the multiframe frame synchronization is established at this point.

The error check bits (e1, e2, . . . , e6) which are shown in the rightmost column of FIG. 5 are six bits inserted as the results of a CRC error check executed with respect to the received signal in the second end office 12 of FIG. 1. The CRC arithmetic circuit for this purpose is not shown in the drawing.

The m bits which are inserted at every other frame are the most closely related to the present invention, these m bits being collected to form a data link. The above-noted data format, which forms the above-noted subsignalling information Ss is made up of groups of m bits which form the data link. This data format is preferably the LAPD format.

FIG. 6 is a drawing which shows an example of a known LAPD format. The m bits which make up the data link shown in FIG. 5 are mapped sequentially in the bit direction and in the byte direction to define the data in FIG. 6. Specifically, these data are defined as a data changing flag, an LAPD start flag, the G1 through G6 bit data of the One-Second Report, and the FCS (Frame Check Sequence) data. This FCS is the result of a CRC calculation which is performed with respect to the LAPD format data itself.

The data changing flag (11111111) in FIG. 6 is used in some cases and not used in other cases.

The One-Second Report in FIG. 6 indicates that a report is to be made once each second, as called for by, for example, ANSI (American National Standards Institute).

In the case in which the LAPD format shown in FIG. 6 is used, the subsignalling information Ss in the present invention can be generated using the One-Second Report area which is mapped onto a prescribed position within the LAPD format. It is also possible to form the subsignalling information Ss using the FCS bits. These FCS bits and bits G1 though G6 in the One-Second Report area make up the above-described transmission quality monitoring data.

The G1 through G6 bits in the One-Second Report area are transmission quality monitoring data which indicate an error event (CRC error event). In accordance with ANSI, these bits are defined as shown below, with the transmission quality deteriorating going in the lower order direction.

Furthermore, G1=1 indicates that the G1 bit is made a logic 1, the same being true for the other bits G2 through G6.

G1=1 CRC error events=1
G2=1 1<CRC error events≦5
G3=1 5<CRC error events≦10
G4=1 10<CRC error events≦100
G5=1 100<CRC error events≦319
G6=1 CRC error events≧320

Bits G1 through G6 are each a group of four bits, which correspond to the t0 data, t1 data, t2 data, and t3 data. The t0 data is the current data, t1 data is the data of one second ago, t2 data is the data of two seconds ago, and t3 is the data of three seconds ago, which are data worth of four seconds in total. The reason for observing the data of three, two, and one second ago is to determine the past CRC error event history, this providing the advantage of enabling improvement in the CRC error checking accuracy. Past data of four or more seconds ago is held in a register (not shown in the drawing) in the second end office 12 of FIG. 1.

Returning to FIG. 2 and FIG. 3, the main synchronizing unit 31 can be implemented, for example, as an ESF synchronizing unit 41. This ESF synchronizing unit 41 detects the frame synchronization pattern (fixed as 001011) of FIG. 5, and when this pattern is detected, the main signal information (ESF multiframe) synchronization is established. Thereafter, a frame timing pulse Pf is output.

In FIG. 2 and FIG. 3, the sub-synchronizing unit 32 detects the head pattern of the LAPD format to establish synchronization with the LAPD format. Specifically, this is indicated as the "01111110" pattern detection unit 42. The all "1" of the ALL "1" detection unit 43 corresponds to the data changing flag of FIG. 6.

First, the timing generation unit 33 generates the aforesaid timing signals T. To do this, the timing generation unit 33 is basically formed by a bit pulse generator 44 and a byte pulse generator 45. First, the frame timing pulse Pf is received, and the bit pulse generator 43 sequentially generates the bit pulses shown at the top of FIG. 6 in the direction of the BIT arrow, one pulse at a time. Therefore, if for example the t0 data area is referenced, the G6 bit of this area is defined by the generation of the 1st bit pulse (counting from the right side in FIG. 6), the G4 bit being defined by the generation of the 6th bit pulse.

The byte pulse generator 45 sequentially generates the byte pulses shown in FIG. 6 in the direction of the BYTE arrow, one pulse at a time. For example, the byte which includes the G1 and G2 bits in the t1 data area is defined by the 8th byte pulse (counting from the LAPD start flag byte), the byte which includes the G3, G4, G5, and G6 bits of the t3 data area being defined by the 11th byte pulse.

Therefore, it is possible to specify a desired bit by means of the intersections of matrix defined by the horizontal direction bit pulses and the vertical direction byte pulses in FIG. 6. The decoders 46, . . . , 51 of FIG. 2 are provided for this purpose. Decoder 46 outputs the read pulse Pr at the intersection of the 6th byte and the 5th bit. As a result, the AND gate (G1) 61 in FIG. 3 is opened, enabling the G1 bit shown in FIG. 6 (in the t0 data area) to pass through the data link data (DLINK data).

In the same manner, the decoder 51, for example, outputs the read pulse Pr at the intersection of the 5th byte and the 1st bit. As a result, the AND gate (G6) 66 of FIG. 3 is opened, enabling the G6 bit shown in FIG. 6 (in the t0 data area) to pass through the data link data (DLINK data).

In this manner, the G1 through G6 bits which pass through AND gates 61 through 66 are temporarily held in the data latch 67. As shown in FIG. 6, because a group of bits G1 through G6 exists for the t1 data, the t2 data, and the t3 data as well as for the t0 data, to indicate what group of data is to be specified, the G bits are held in the data latch 67 only at the time when the latch pulse Lp is received from the t0 data latch pulse generator 52. The t0 data latch pulse generator 52 outputs the latch pulse Lp each time the timing of the 5th byte and the 6th byte is detected. The limitation in this manner to the t0 data, as described previously, provides the advantage of making the related hardware smaller.

The transmission quality monitoring data (G1 through G6 bits in the t0 data) which are held in the data latch 67 are entered into an MPU register 68. A CPU 69 searches the MPU register 68 periodically, for example every 1 second, and performs collection of the subsignalling information. The CPU 69 performs analysis of the subsignalling information it has found, and notifies the operator of this as monitoring information.

In FIG. 2 and FIG. 3, the MPU register 68 receives and temporarily holds not only the above-noted subsignalling information from the data latch 67, but also the invalidity information from the invalidity detection unit 34.

This invalidity information includes at least the above-described seven conditions. If the invalidity detection unit 34 detects at least one of these seven conditions, notification of this is made to the MPU register 68. In the first embodiment of the present invention shown in FIG. 2 and FIG. 3, the invalidity information is received from the plural is check unit 71 and monitored. This invalidity information corresponds to the above-described condition 1. That is, this is a check of whether G1 through G6 includes two or more 1s in total. For example, according to ANSI, the prescribed condition is that in which either all of G1 through G6 are 0 or only one bit of G1 through G6 is made 1, so that a plurality of bits being made 1 indicates some form of abnormality. This is treated as the 1st invalidity information.

In FIG. 3, the output of the one second monitor unit 72 is monitored as the 2nd invalidity information. This corresponds to the above-described condition 2. That is, this is a check of whether or not it is possible to detect the LAPD for one second or longer. The One-Second Report calls for transmission one time each second, so that if this requirement is not satisfied, there is clearly an abnormality that has occurred.

In FIG. 3, the outputs of the interrupt monitor unit 73 and the one second monitor unit 72 are monitored as the 3rd invalidity information. This corresponds to the above-described condition 3. That is, this is a check of whether retransmission of the LAPD format occurs within one second after the input of an interrupt signal to the LAPD format.

In addition in FIG. 3, the DS1 alarm is monitored as the 4th invalidity information. This corresponds to the above-described condition 4. That is, this is a check of whether suspension of the input signal Sin to the first end office 11 is detected and whether the AIS (Alarm Indication Signal) is detected from the input signal Sin. The suspension of the input signal Sin can be easily detected, for example by providing in the ESF synchronizing unit 41 a suspension detection unit which detects whether the input signal is present. The AIS signal can be easily detected by providing in the ESF synchronization unit 41, an AIS detection unit which detects the overwriting of the data part of the input signal Sin will all is.

In FIG. 3, the out-of-synchronization signal (SYNC LOSS) from the ESF detection unit 41 is monitored as the 5th invalidity information. This corresponds to the above-described condition 5. That is, this is a check which consists of watching the input signal Sin and checking whether synchronization has been lost in the main synchronizing unit 31.

Figure 7:
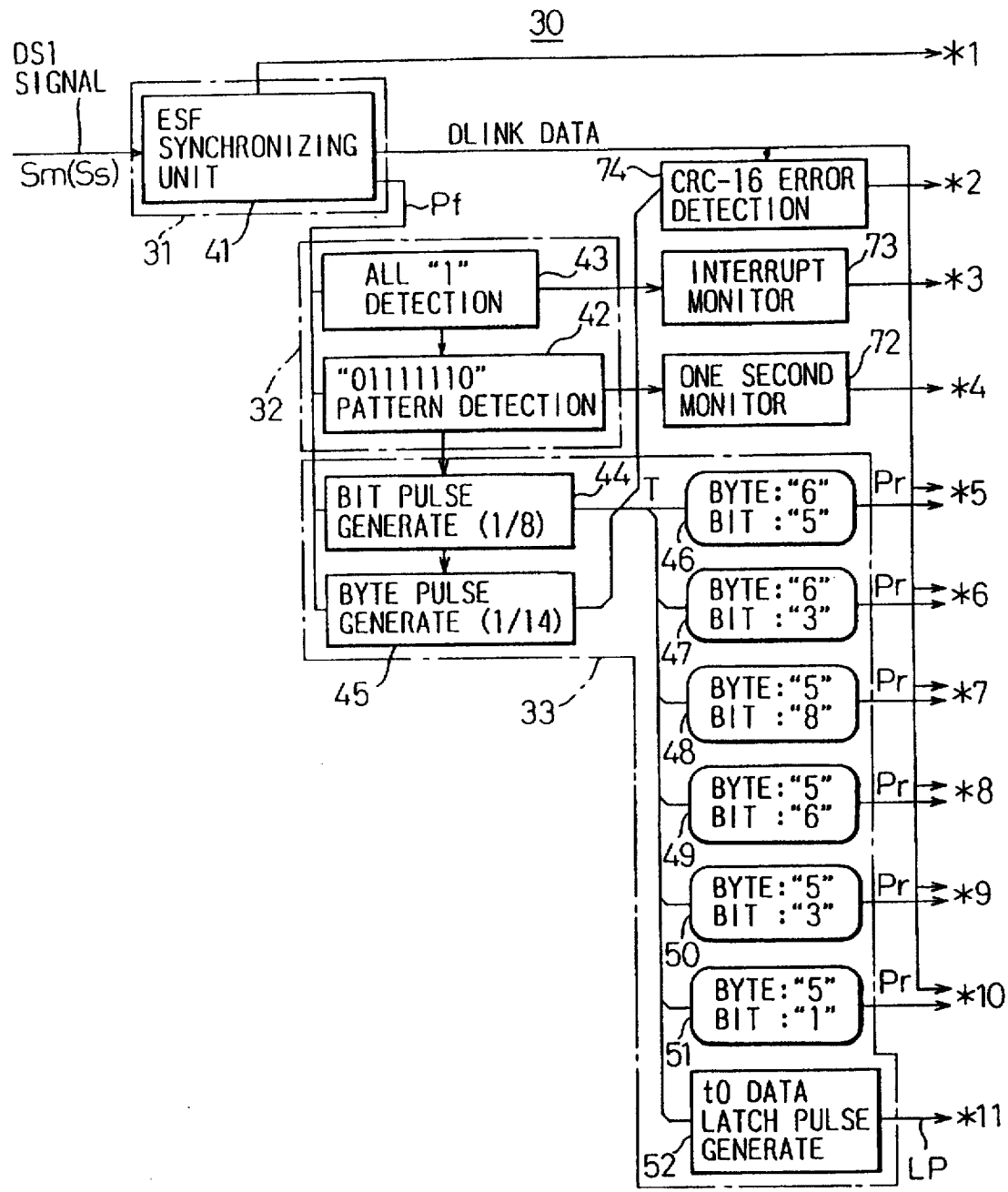
FIG. 7 is first drawing which shows a second embodiment of a monitor means according to the present invention.
Figure 8:
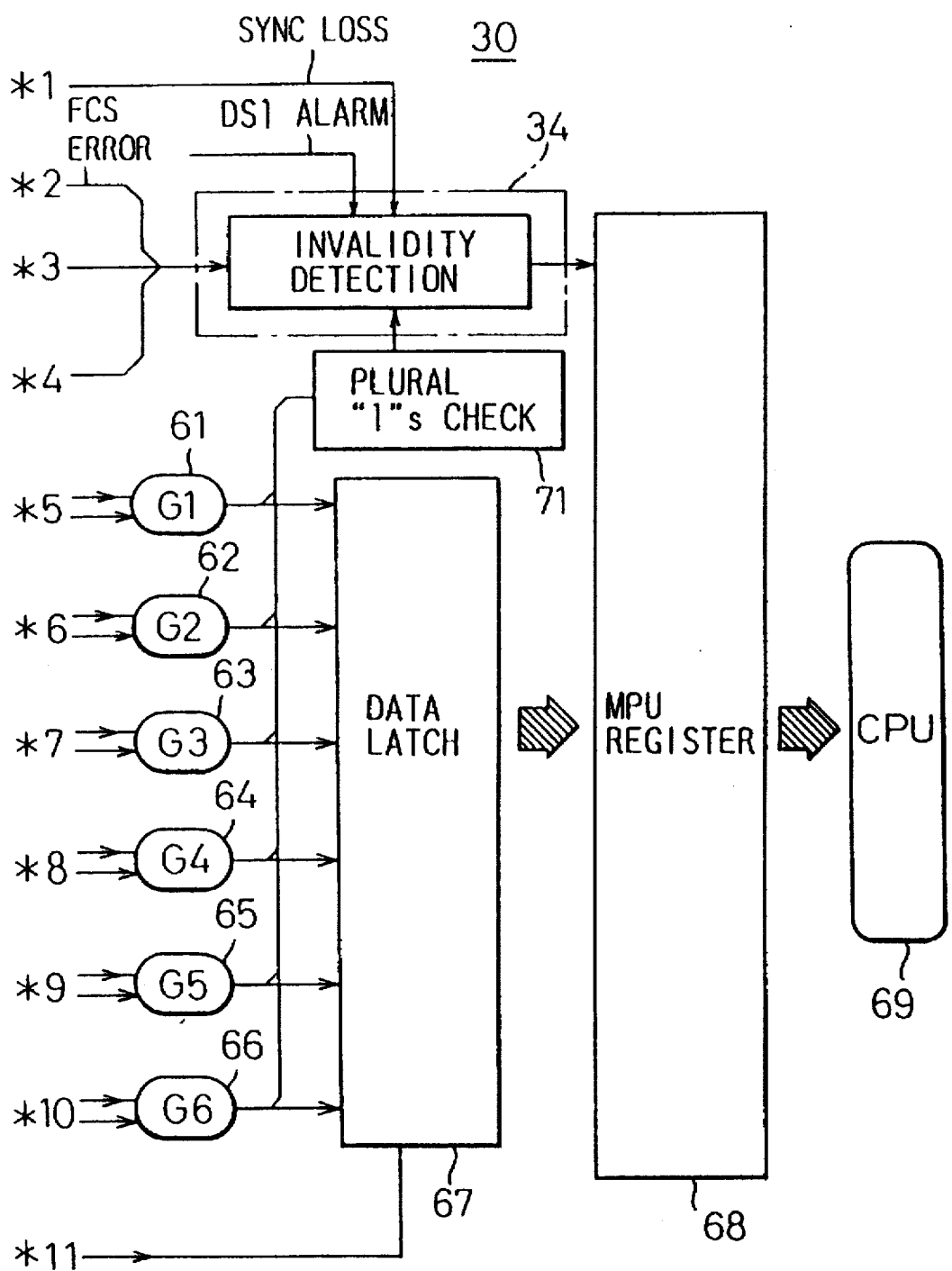
FIG. 8 is second drawing which shows a second embodiment of a monitor means according to the present invention.

FIG. 7 is a first drawing which shows the second embodiment of a monitor means according to the present invention, and FIG. 8 is a second drawing which shows this second embodiment of a monitor means according to the present invention. In this second embodiment, the FCS error (FCS ERROR) is applied as the 6th invalidity information to the invalidity detection unit 34, and to achieve this, the CRC-16 error detection unit 74 shown in FIG. 7, for example, is provided. This CRC-16 error detection unit 74 extracts and detects the data link data (DLINK data) corresponding to frames 13 and 14 in FIG. 6.

This 6th invalidity information corresponds to the above-described condition 6. That is, this is a check of whether or not an FCS error has been detected.

Figure 9:
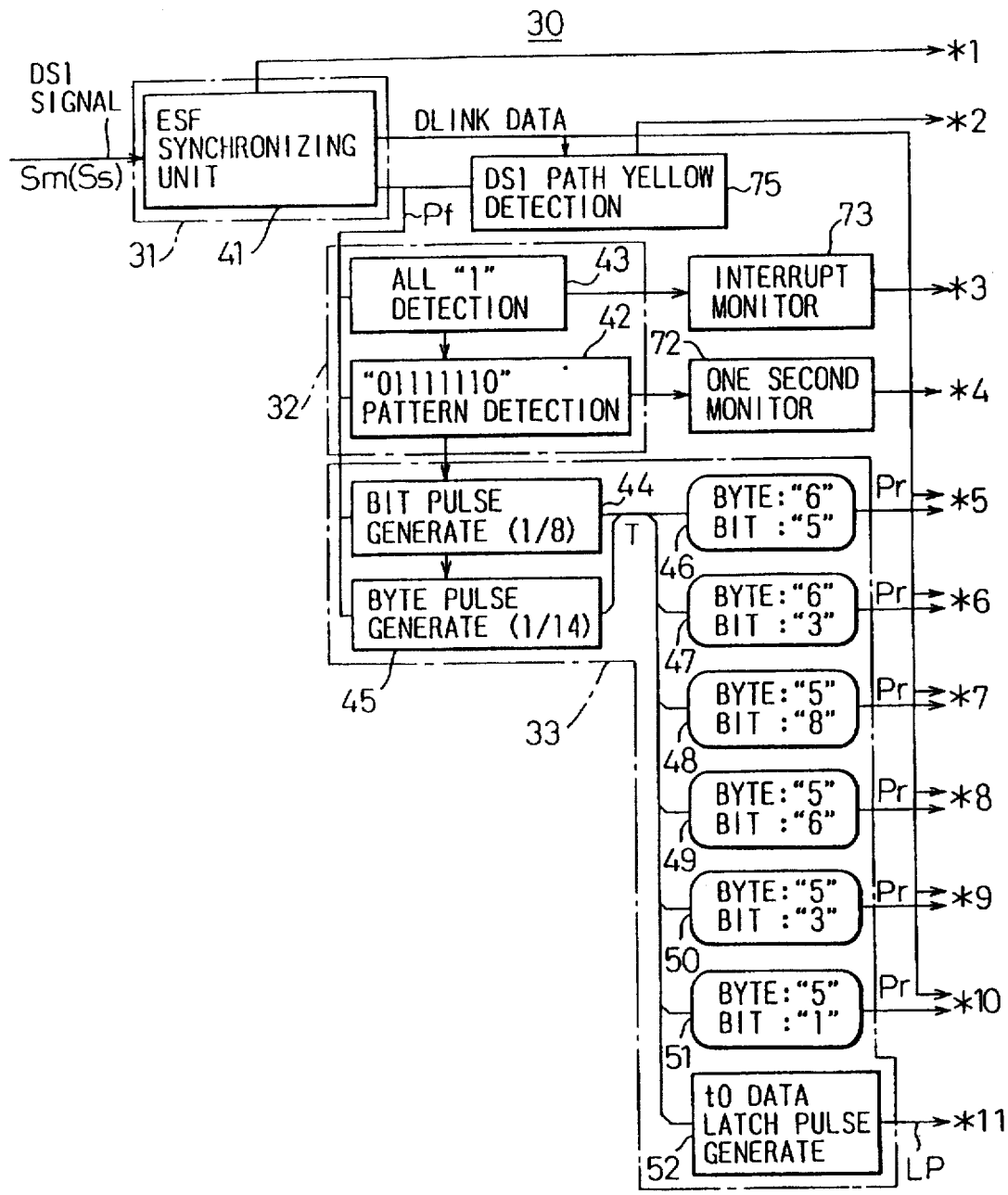
FIG. 9 is first drawing which shows a third embodiment of a monitor means according to the present invention.
Figure 10:
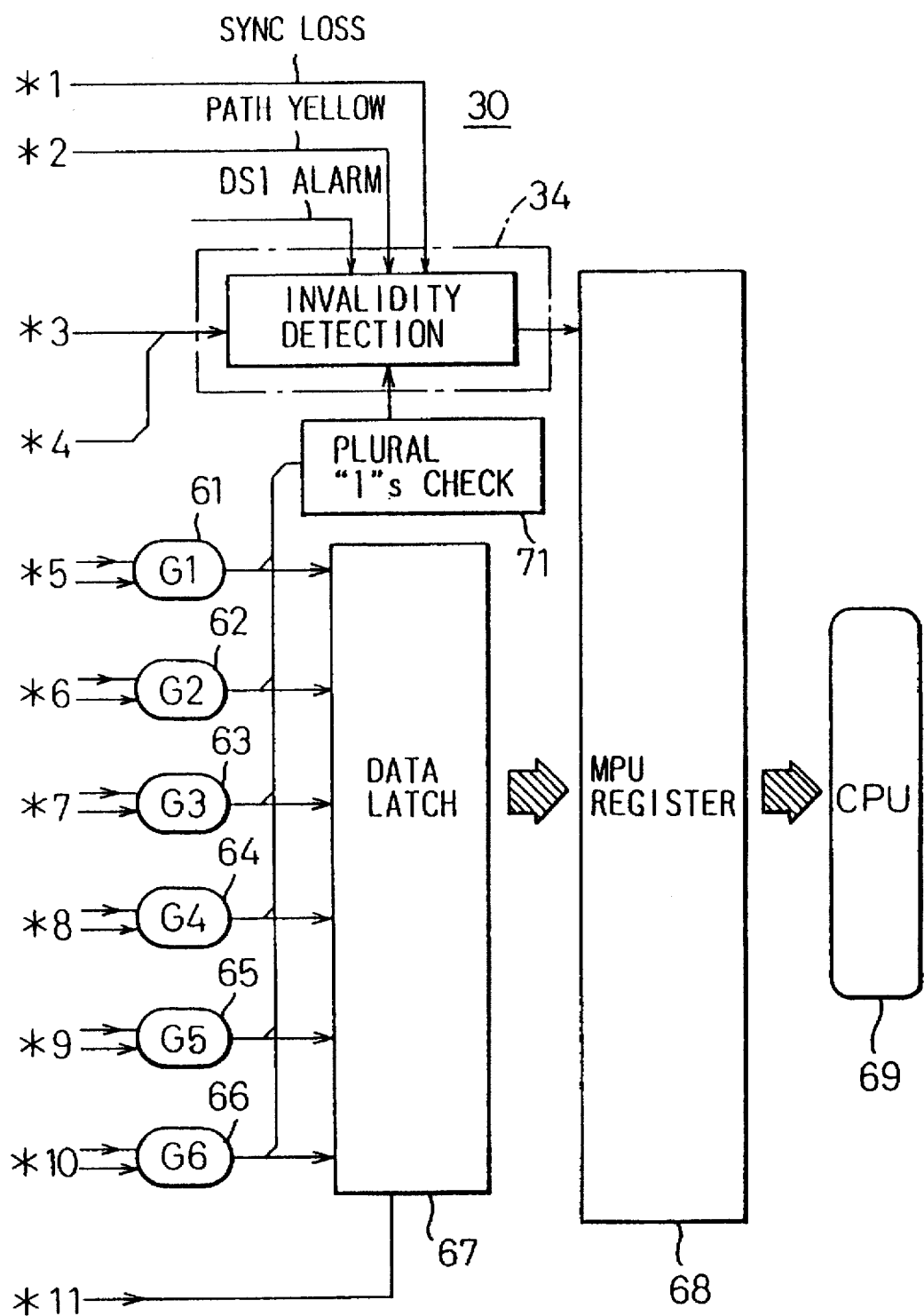
FIG. 10 is second drawing which shows a third embodiment of a monitor means according to the present invention.

FIG. 9 is a first drawing which shows the third embodiment of a monitor means according to the present invention, and FIG. 10 is a second drawing which shows this third embodiment of a monitor means according to the present invention. In this third embodiment, the DS1 PATH YELLOW alarm is applied to the invalidity detection unit 34 as the 7th invalidity information, and to achieve this, the DS1 PATH YELLOW detection unit 75 is provided as shown in FIG. 9. The Yellow Alarm is defined, for example by ANSI, as the code word "0000000011111111", and when this is included in the input signal Sin, that is, when this code word is inserted in the data link data, the judgment is made that some sort of abnormality exists in the input signal Sin. This corresponds to the above-described condition 7.

Figure 11:
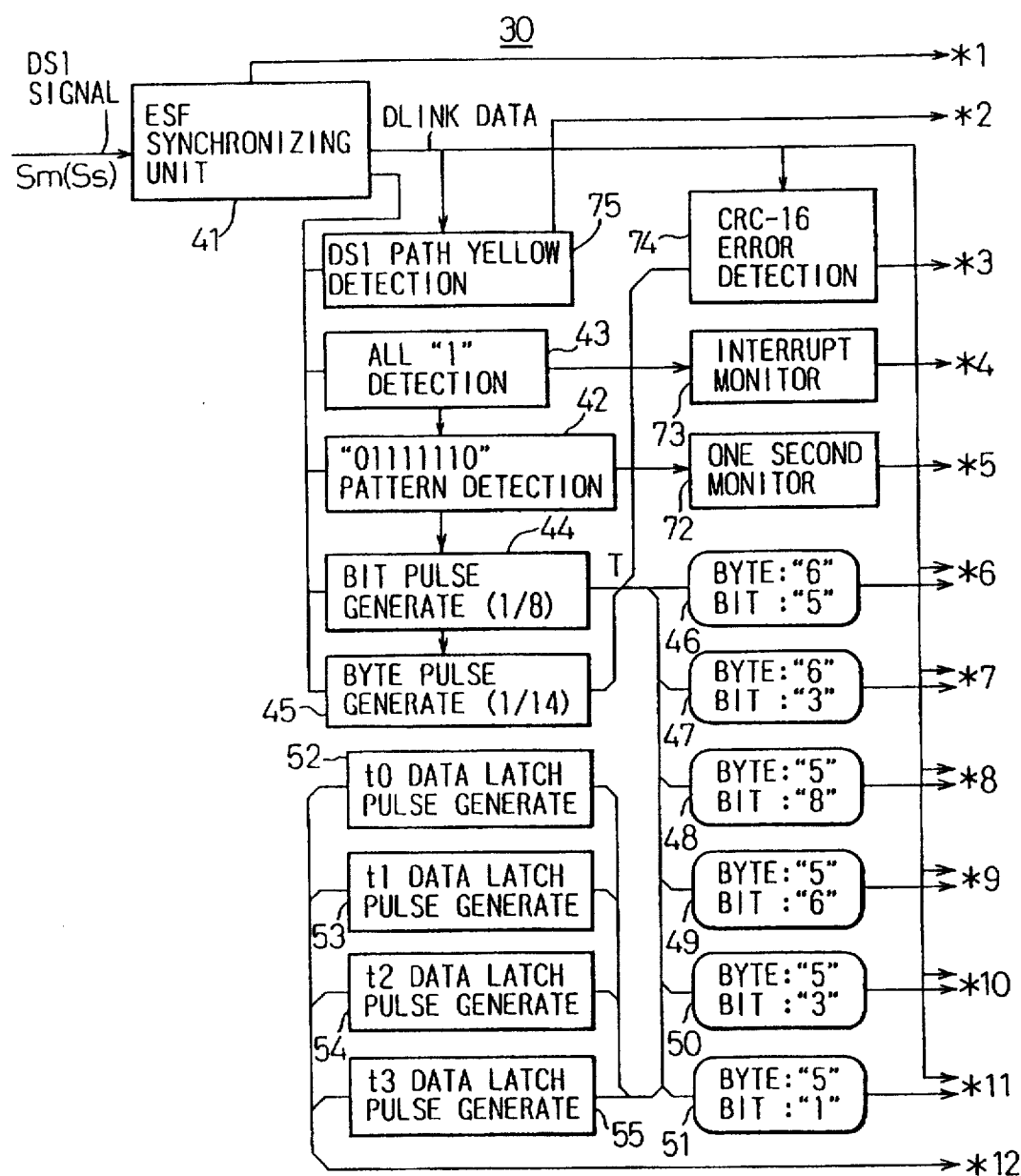
FIG. 11 is first drawing which shows a variation of the first, second, and third embodiments.
Figure 12:
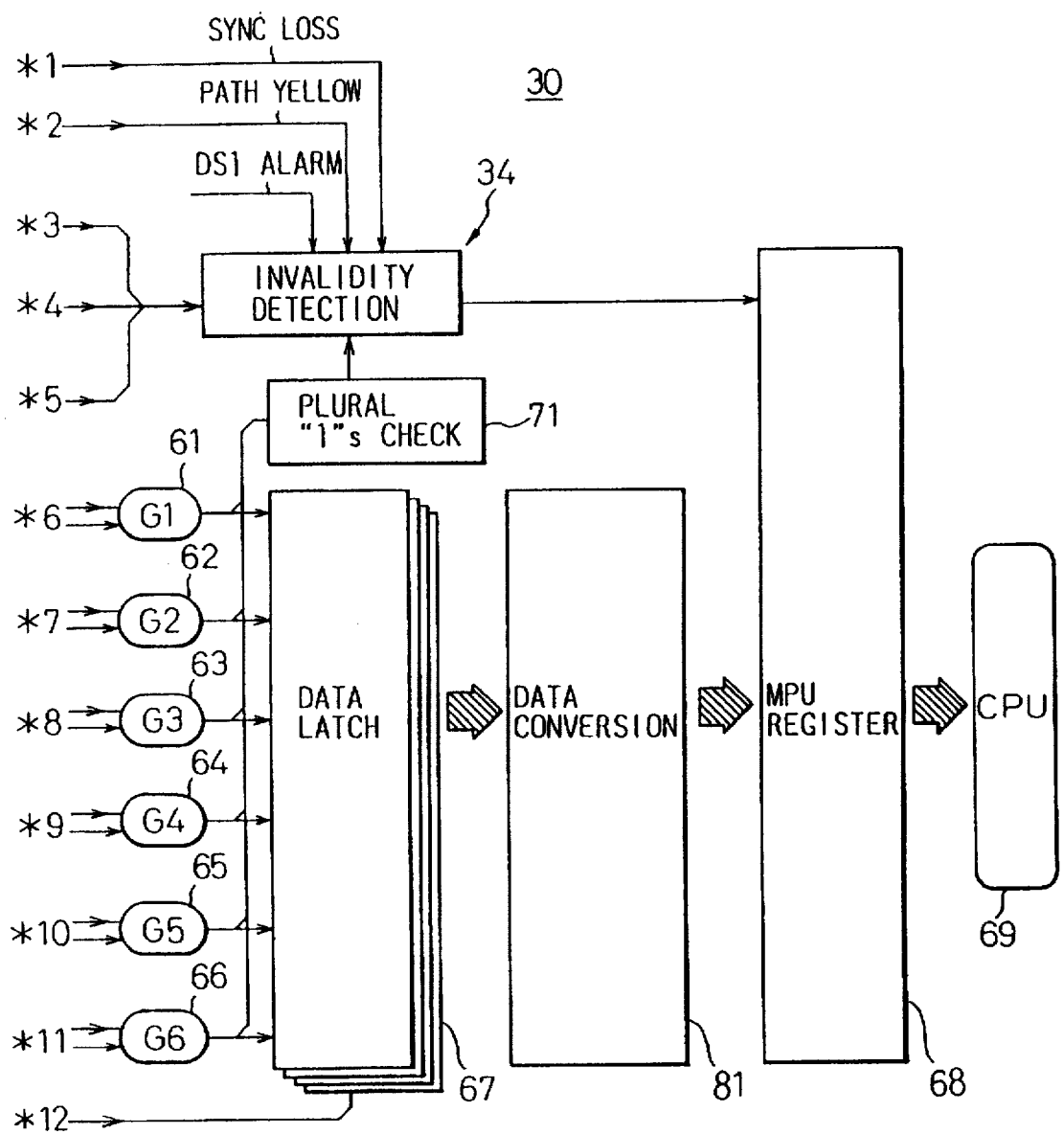
FIG. 12 is second drawing which shows a variation of the first, second, and third embodiments.

FIG. 11 is a first drawing which shows a variation of the first, second, and third embodiments of the present invention, and FIG. 12 is a second drawing which shows this variation. The difference between this variation and each of the above-noted embodiments is within the timing generation unit 33, in which in addition to a t0 data latch pulse generator 52, latch pulse generators 53, 54, and 55 are provided for the t1 data, t2 data, and t3 data, respectively.

Specifically, four types of timing signals are generated, these extracting the four groups of bits G1 through G6 which are mapped as the t0 data, the t1 data of one second ago, the t2 data of two seconds ago, and the t3 data of three seconds ago within the One-Second Report area, with the monitor means 30 performing monitoring based on the thus extracted G1 through G6 bits. By doing this, it is possible to perform even high-accuracy monitoring than the case in which only the t0 data is monitored.

However, since the volume of the signals is simply multiplied four-fold, the latter stages which perform processing increase greatly in scale. Because of this, a data conversion unit 81 is provided to perform re-adjustment of data.

Figure 13:
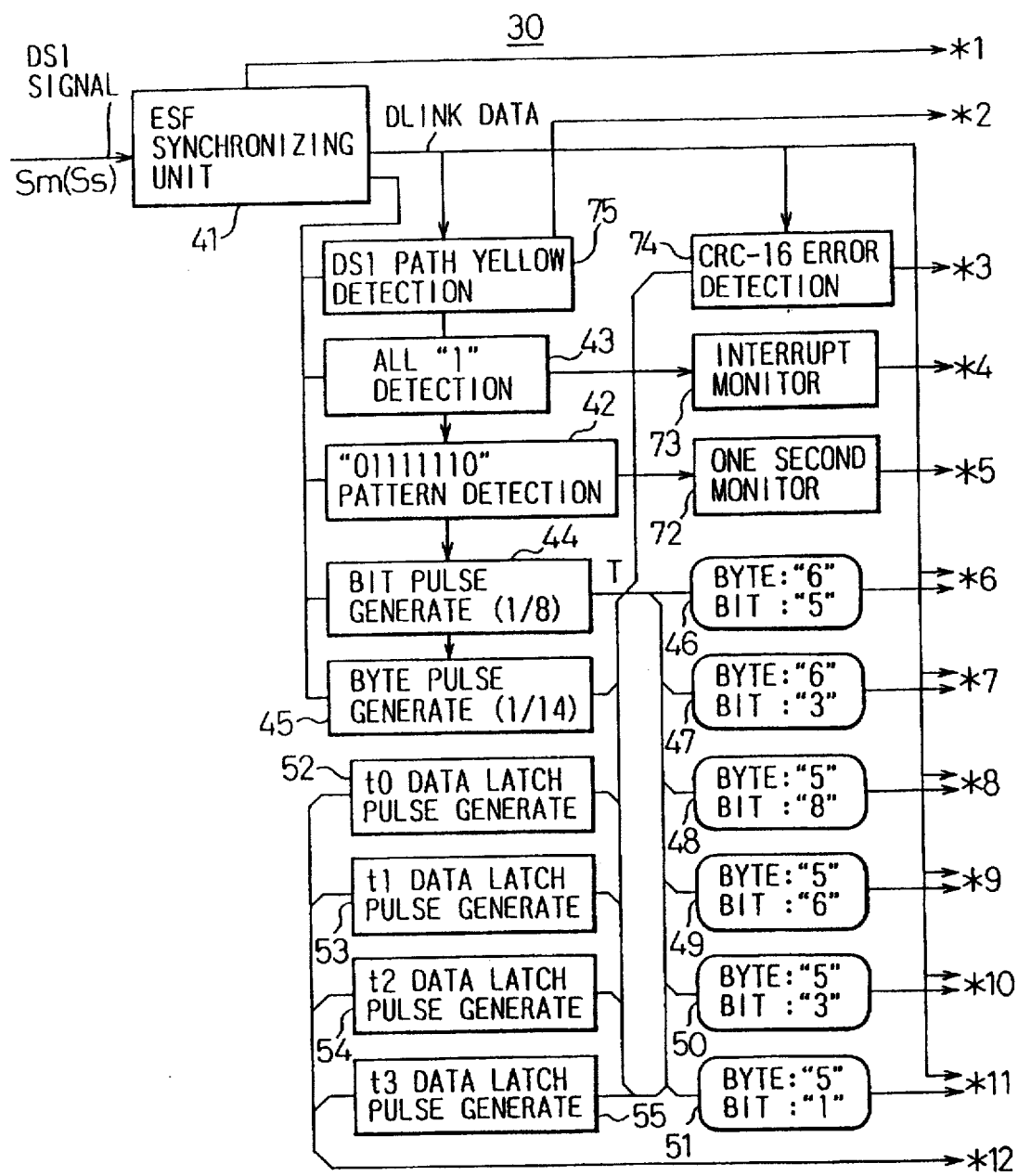
FIG. 13 is a first drawing which shows details of the configuration of FIG. 11 and FIG. 12.
Figure 14:
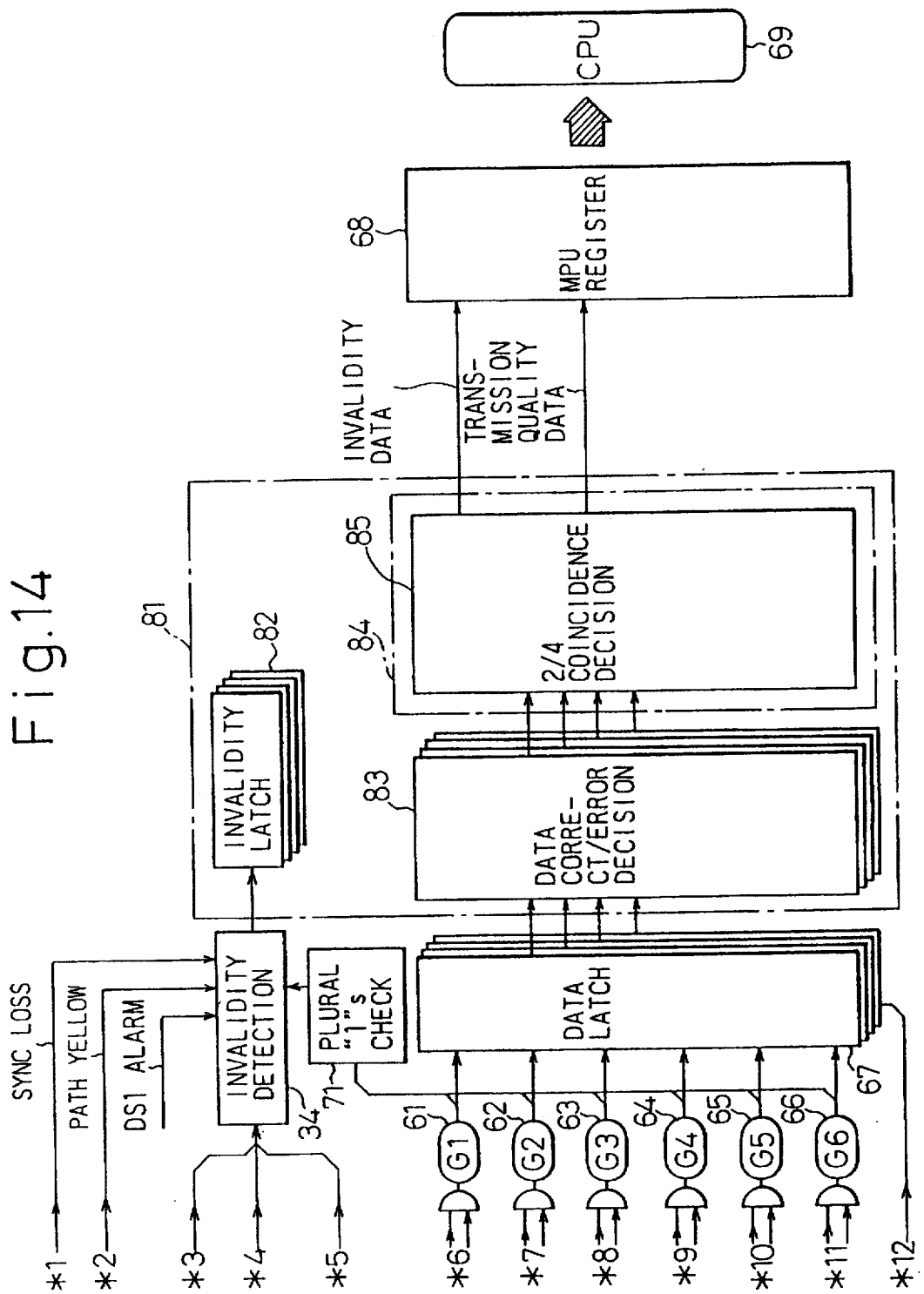
FIG. 14 is a second drawing which shows details of the configuration of FIG. 11 and FIG. 12.

FIG. 13 is a first drawing that shows details of the configuration of FIG. 11 and FIG. 12, and FIG. 14 is a second drawing that shows details of the configuration of FIG. 11 and FIG. 12. These drawings show in particular the details of the data conversion unit 81. The four groups of invalidity detection signals from the invalidity detection unit 34, which correspond to the t0 data, t1 data, t2 data, and t3 data, are each temporarily held in corresponding invalidity latch units 82.

The four groups of G1 to G6 bits which correspond to the t0 data, t1 data, t2 data, and t3 data are captured into the corresponding data latches 67.

The above-noted four groups of invalidity signals and four groups of G1 to G6 bits are each input to a data correct/error decision unit 83. This data correct/error decision unit 83 judges the G1 to G6 bit information to be erroneous data when the corresponding invalidity detection signals are produced at each period at which t0 data, t1 data, t2 data, and t3 data appear, and discard this data. When the invalidity detection signal is not produced, the G1 to G6 bits are taken to be correct, and these are output to the next stage, the priority decision unit 84.

In the case in which the G1 to G6 bits of the four groups of G1 to G6 bits, which are extracted via the data latch 67 as t0 data, t1 data of one second ago, t2 data of two seconds ago, and t3 data of three seconds ago, are not all the same for each group, if the G1 to G6 bits for two or more groups coincide, the coinciding G1 to G6 bits are selected for use by the priority decision unit 84, the monitor means 30 performing monitoring based on the transmission quality monitoring data indicated by this thus select G1 to G6 bits. Therefore, in this case the priority decision unit 84 can be implemented as the ¾ coincidence circuit 85, for example.

Figure 15:
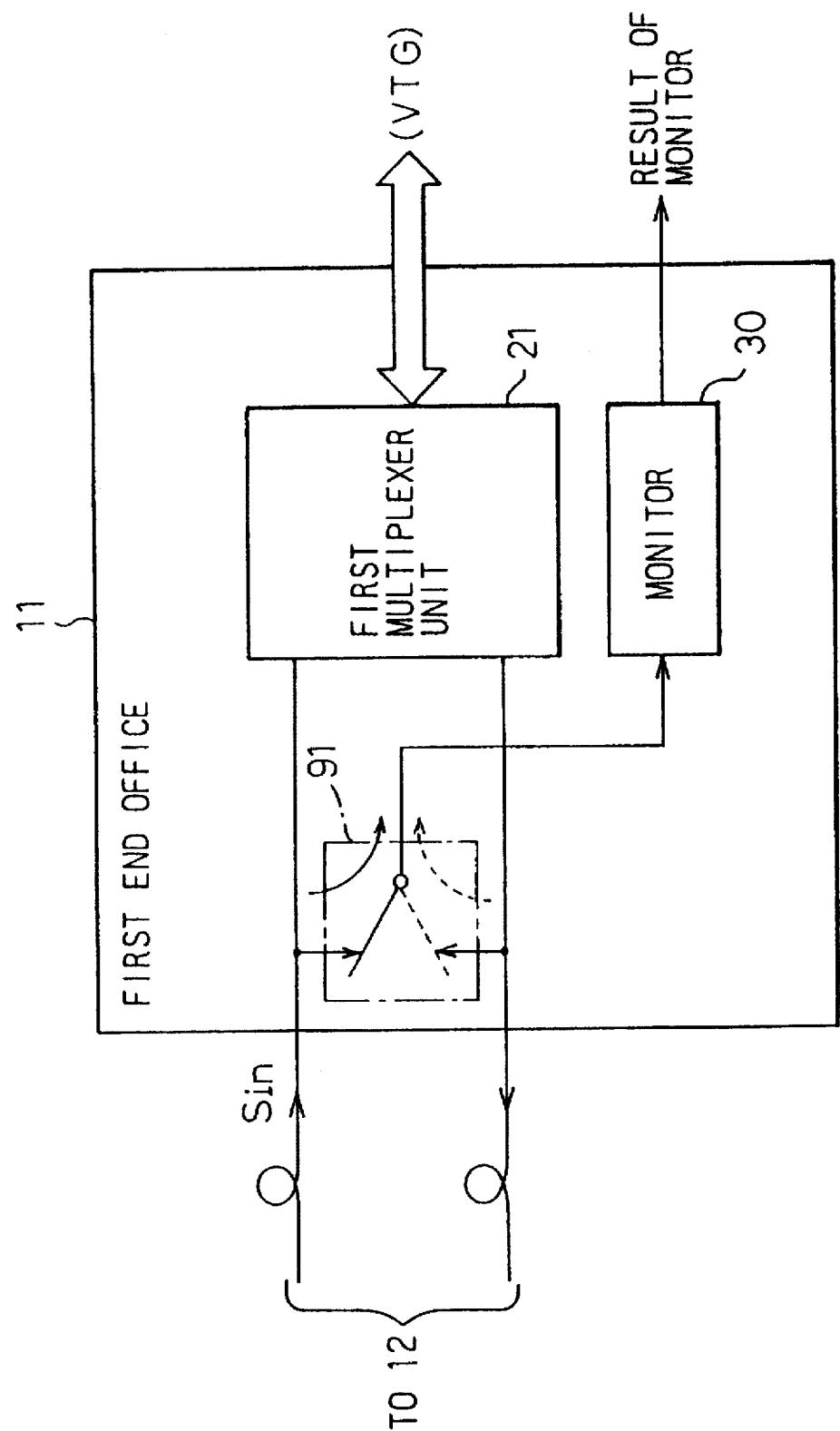
FIG. 15 is a drawing which shows another example of the use of a monitor means.

FIG. 15 is a drawing which shows an example of another use of the monitor means. A main point of this drawing is the selector 91, this selector 91 being introduced into the first end office 11 of FIG. 1.

Specifically, the selector 91 is provided at the input side of the monitor means 30, this selector 91 performing selective changeover between the output signal sent from the first end office 11 to the second end office 12 and the input signal Sin input from the second end office 12 to the first end office 11, as the signal to be input to the monitor means 30. By doing this, it is possible not only to perform monitoring by comparing the upstream and downstream signals, but also, when an abnormality occurs, to determine whether the problem is occurring on the upstream or the downstream signal. Therefore, compared to the case in which this selector 91 is not used, it is possible to perform more detailed analysis of transmission quality.

A further explanation of the ESF synchronizing unit 41 in the above-described embodiment is provided below.

Figure 16:
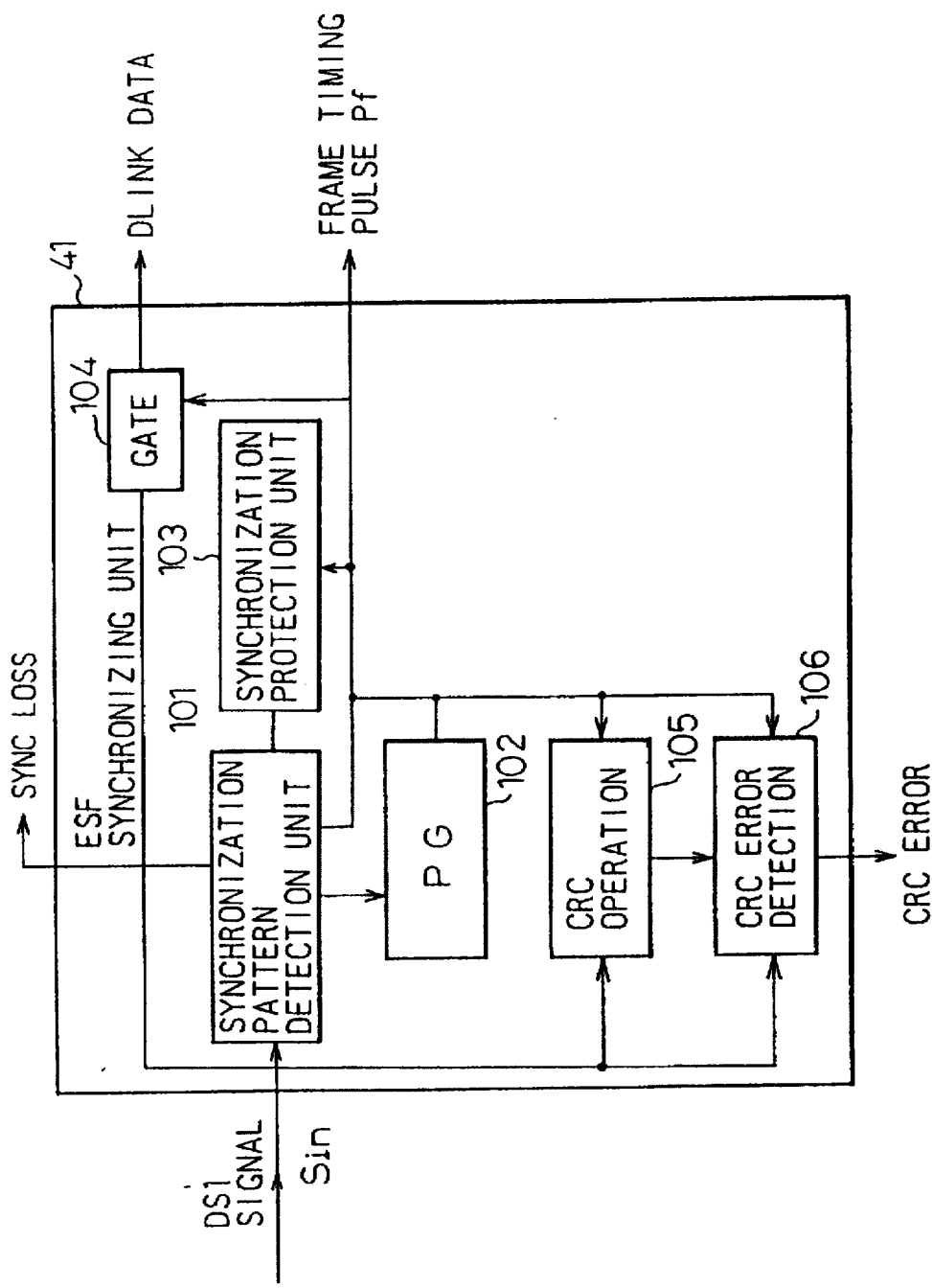
FIG. 16 is a drawing which shows a detailed example of an ESF synchronizing unit.

FIG. 16 is a drawing which shows details of the ESF synchronizing unit. The ESF synchronizing unit 41 receives the input signal Sin, and as shown in, for example, FIG. 2, outputs a frame timing pulse Pf and data link data (DLINK data).

The input signal Sin, for example a DS1 signal, is input to the synchronization pattern detection unit 101, at which the frame synchronization pattern is detected. According to the example shown in FIG. 5, this frame synchronization pattern is "001011".

In the case in which the frame synchronization pattern is detected by this synchronization pattern detection unit 101, the synchronization protection unit 103 performs usual front protection and rear protection.

When synchronization is established by the synchronization pattern detection unit 101 and the synchronization protection unit 103, the pulse generator (PG) 102 is activated, the pulse that this pulse generator generates being used as the frame timing pulse Pf. This pulse Pf is as shown in, for example, FIG. 2.

When gate 104 is opened by this pulse Pf, the DLINK data (as shown, for example, in FIG. 2) is obtained. In addition, the SYNC LOSS which is shown in FIG. 2, for example, is output from the synchronization pattern detection unit 101.

The CRC operation unit 105 and the CRC error detection unit 106 in FIG. 16 are provided for the purpose of verifying the line accuracy, and do not directly participate in the synchronization detection function.

Figure 17:
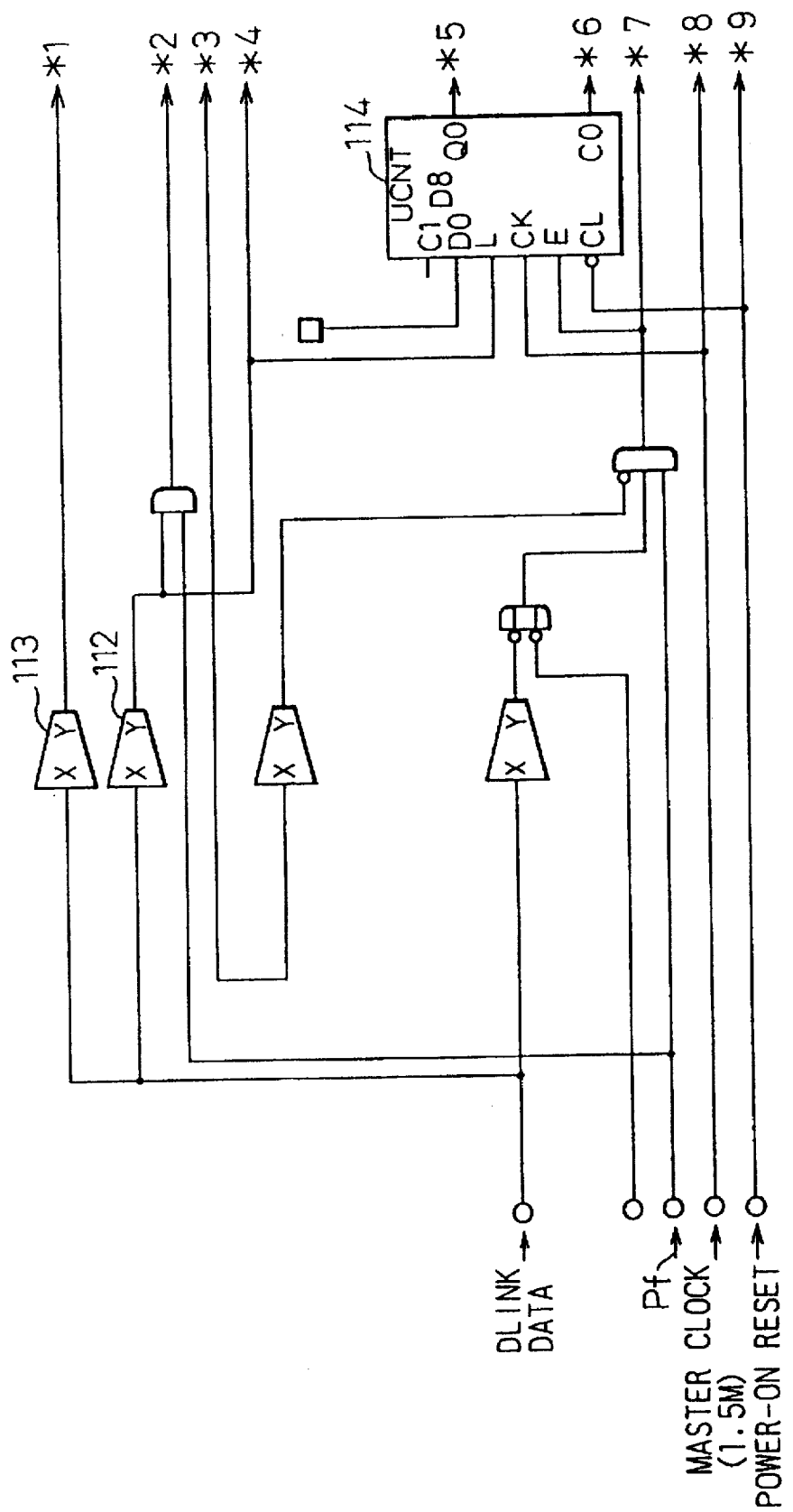
FIG. 17 is a first drawing which shows an example of the circuits that actually comprise the sub-synchronizing unit and the front stage of the timing generation unit.
Figure 18:
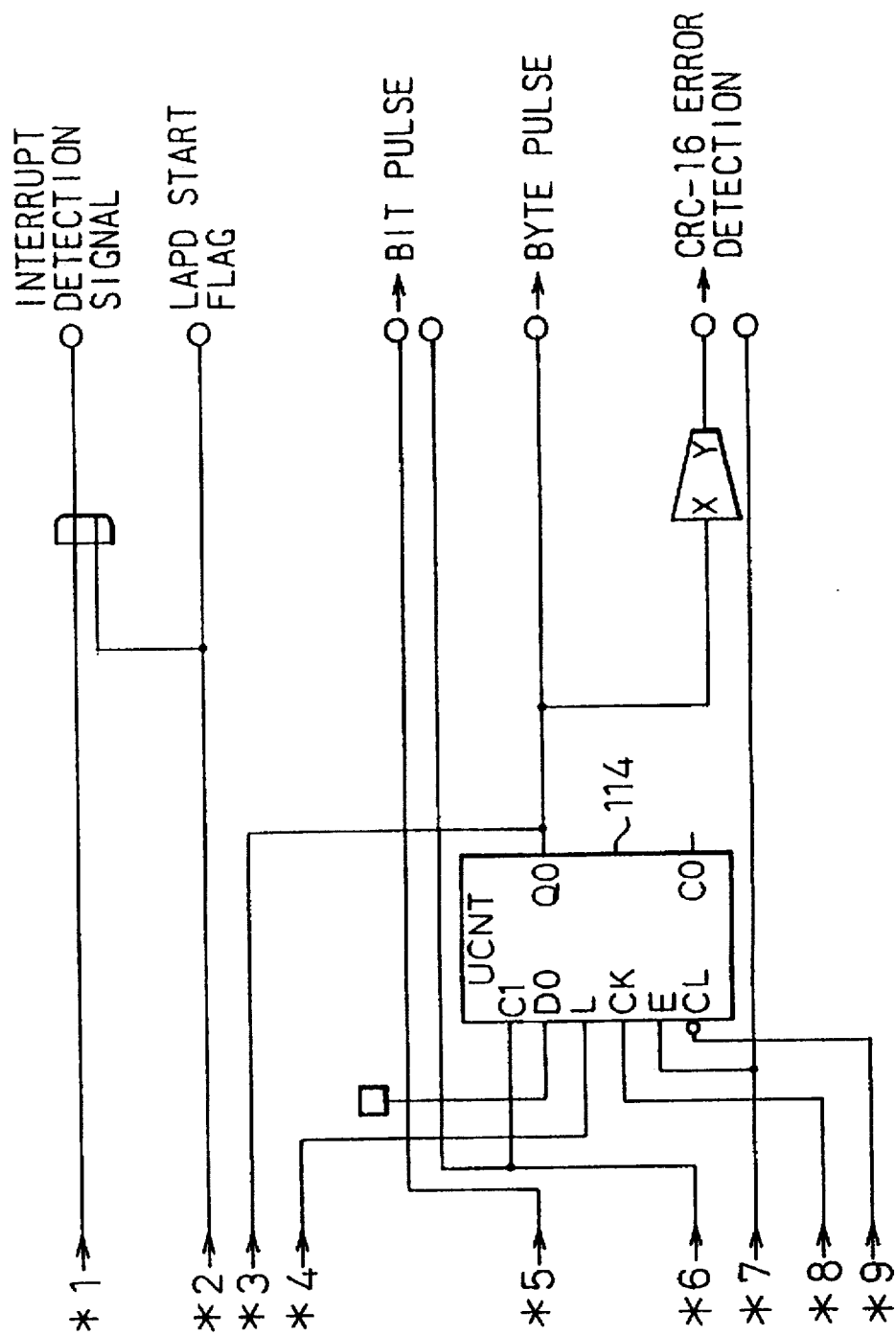
FIG. 18 is a second drawing which shows an example of the circuits that actually comprise the sub-synchronizing unit and in the front stage of the timing generation unit.

FIG. 17 is a first drawing which shows an example of the circuits actually forming the sub-synchronizing unit 32 and the front stage of the timing generation unit 33, and FIG. 18 is a second drawing which shows an example of the circuits actually forming the sub-synchronizing unit 32 and the front stage of the timing generation unit 33. Because they are circuits designed for an actual product, these drawings include circuit parts that are not related to the essence of the present invention. Therefore, these circuit parts which are not intrinsically related will not be described.

In FIG. 17 and FIG. 18, the reference numeral 112 denotes a decoder which serves as the "01111110" pattern detection unit 42 of, for example, FIG. 2, 113 is a decoder which serves as the ALL "1" detection unit 43 of, for example, FIG. 2, 114 is an octal counter which serves as the bit pulse generator 44 of, for example, FIG. 2, and 115 is a base-14 counter which serves as the byte pulse generator 45 of, for example, FIG. 2.

It is possible to implement the one second monitor unit 72 shown in, for example, FIG. 2 using a common timer.

It is possible to implement the interrupt monitor unit 73 by merely detecting and holding whether there is an ALL "1" signal from the ALL "1" detection unit 43, using for example a flip-flop.

The invalidity detection unit 34 shown in, for example, FIG. 2, can be implemented by an OR gate, inputting various invalidity information such as the SYNC LOSS, DS1 Alarm, and PATH YELLOW signal or the like, using the OR gate to take the logical sum of this invalidity information.

The plural 1s check unit 71 can be implemented by a group of EX-OR gates provided so as to correspond to all the combinations of two bits selected from the six bits G1 through G6, and an OR gate which has as inputs the outputs of each of the EX-OR gates in the group of EX-OR gates.

In addition, it is possible to implement the data latch 67 shown in, for example, FIG. 2 by D-type flip-flops which accept the G1 to G6 bits at their D input.

Figure 19:
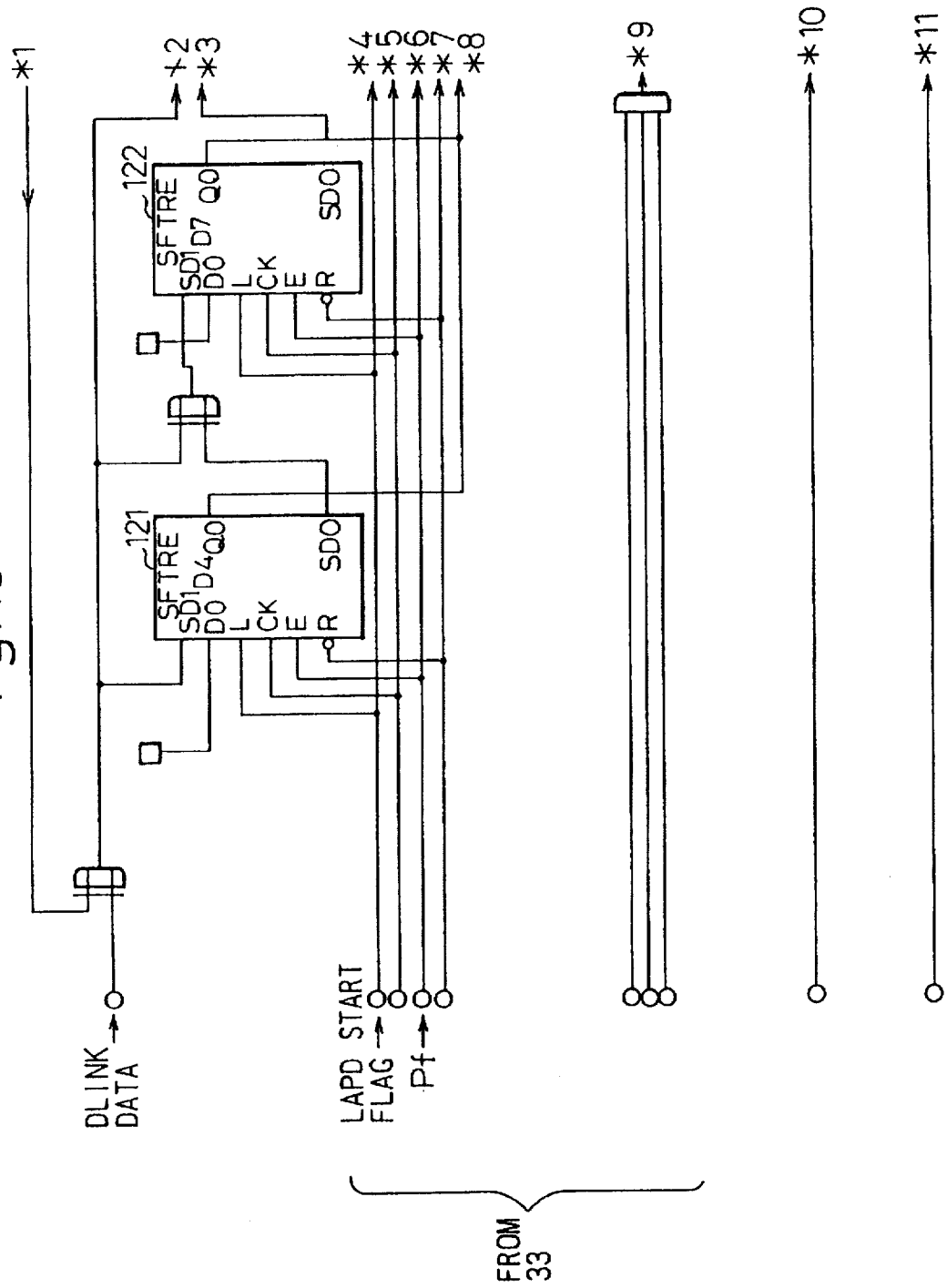
FIG. 19 is a first drawing which shows an example of the circuits that actually comprise the error detection unit.

FIG. 19 is a first drawing which shows an example of the circuits that actually comprise the CRC-16 error detection unit, and FIG. 20 is a second drawing which shows an example of the circuits that actually comprise the CRC-16 error detection unit. The CRC-16 error detection unit 74 shown in, for example, FIG. 7, that is, the FCS error detection unit, can be implemented as shown in FIG. 19 and FIG. 20. Parts that are not intrinsically related the present invention are not described herein.

The reference numerals 121, 122, and 123 denote a 5-bit shift register, a 7-bit shift register, and a 4-bit shift register, respectively, these together forming the CRC arithmetic circuit.

The reference numerals 131 and 132 denote D-type flip-flops, which establish the FCS decision timing.

The reference numeral 141 denotes a D-type flip-flop which holds the result of the calculation by the CRC arithmetic circuit (121, 122, and 123), CRC error results being obtained via the decoder 14, based on the held data.

The DS1 YELLOW PATH detection unit 75 which is shown, for example, in FIG. 9 is implemented basically by a decoder, the PATH YELLOW (logic "1") being output by this decoder when the above-described code word "0000000011111111" is input.

As described in detail above, the present invention provides the following results.

<1> According to the first aspect of the present invention, it is possible at the first end office 11 to monitor the transmission quality by monitoring the transmission quality of the signal to be transmitted to a distant location, thereby enabling the management of the transmission quality within a narrower within the digital communication network.

<2> According to the second and the third aspects of the present invention, simple hardware is provided for the purpose of picking up the subsignalling information, which is used in monitoring the transmission quality, from the main signal information which contains this subsignalling information.

<3> According to the fourth and fifth aspects of the present invention, it is possible to make use of the LAPD format, which is generally used in communication networks, or the One-Second Report contained therein as the object of monitoring in the present invention, thereby eliminating the need to define a special protocol.

<4> According to the sixth, seventh, eighth, ninth, tenth, eleventh, and twelfth aspects of the present invention, the bit groups which are generally defined can be utilized as the objects of monitoring in the present invention, thereby eliminating the need to prepare special transmission quality monitoring data.

<5> According to the thirteenth aspect of the present invention, it is possible to analyze the transmission quality of each of the transmitted signal and the received signal, thereby enabling more accurate analysis of transmission abnormalities.

What is claimed is:

1. A digital communication network transmission quality monitoring system for a digital communication network having a first end office which includes a first multiplexer unit and a second end office which includes a second multiplexer unit, add which performs transmission and reception of multiplexed signals between said first end office and said second end office, said transmission quality monitoring system having first monitor means within said first end office, and second monitor means in said second end office for performing monitoring of signal accuracy of a signal received from said first end office, information with regard to said signal accuracy monitored by said second monitor means being included as sub-signalling information in an input signal which is sent to said first end office from said second end office, said sub-signalling information being extracted by said first monitor means at said first end office from said input signal, to enable monitoring of signal accuracy of said input signal, wherein said sub-signalling information is information which is periodically inserted into main signal information which is to be communicated between said first end office and said second end office, and wherein said first monitor means comprises a sub-synchronizing unit which establishes synchronization with said sub-signalling information after synchronization is established with said main signal information, wherein said sub-signalling information is various types of transmission quality monitoring data which are mapped in a prescribed data format, and wherein said first monitor means includes a timing generation unit which generates timing signals for the purpose of individually extracting the various transmission quality monitoring data from said various transmission quality data included in said data format, monitoring of the input signal received by said first end office from said second end office being performed according to said extracted transmission quality monitoring data, wherein said sub-signalling information is composed of multiframes according to ESF (Extended Super Frame), said sub-signalling information being composed by means of a data link which is formed by collecting bits which are assigned to each frame which makes up said multiframe, and said format which comprises the sub-signalling information being the LAPD (Link Access procedure of the D-channel) format which is comprised of the bit groups which make up said data link, said sub-synchronizing unit detecting the head pattern of said LAPD format, so as to establish synchronization of said LAPD format, wherein said timing generation unit, based on said generated timing signals, extracts a One-Second Report area which is mapped onto a prescribed location in said LAPD format, and further individually extracts various transmission quality monitoring data from within said One-Second Report area.

2. A transmission quality monitoring system according to claim 1, wherein said first monitor means performs extraction and monitoring, as transmission quality monitoring data, of bits G1 through G6, which indicate error events within the One-Second Report area.

3. A transmission quality monitoring system according to claim 2, wherein said timing generation unit generates timing signals which extract only bits G1 through G6 which are mapped as t0 data which is current data within said One-Second Report area, and wherein said first monitor means performs monitoring based on said bits G1 through G6 which correspond to said extracted t0 data.

4. A transmission quality monitoring system according to claim 3, wherein four types of timing signals are generated, said timing signals individually extracting four groups of bits G1 through G6 which are mapped as said t0 data, t1 data of one second ago, t2 data of two seconds ago, and t3 data of three seconds ago within said One-Second Report area, said first monitor means performing monitoring based on said extracted bits G1 through G6.

5. A transmission quality monitoring system according to claim 4, wherein a priority decision unit, which, in the case in which all said four groups of bits G1 through G6 extracted individually as said t0 data, t1 data of one second ago, t2 data of two seconds ago, and t3 data of three seconds ago are not all the same, if bits G1 through G6 of each of two or more groups coincide, selects said coinciding bits G1 through G6 as the bits to be monitored, is provided within said first monitor means, monitoring being performed based on said transmission quality monitoring data indicated by the selected bits G1 through G6.

6. A transmission quality monitoring system as in claim 2, wherein said first monitor means includes an invalidity detection unit which, when at least one of the seven conditions, condition 1, in which two or more logic 1s in total are included in any of bits G1 through G6;

condition 2, in which said LAPD format is not detected for a period of one second or longer;

condition 3, in which said LAPD format is not retransmitted within one second after the input of an interrupt signal in said LAPD format;

condition 4, in which either the input signal to said first end office is suspended is detected or an AIS (Alarm Indication Signal) is detected from said input signal;

condition 5, in which, from said input signal, out-of-synchronization is detected at a main synchronizing unit;

condition 6, in which an ESF error is detected; and condition 7, in which a DS1 PATH YELLOW alarm, which indicates abnormality in said input signal, is detected from a data link, is satisfied, detects the satisfying of said condition, so that an abnormality in said input signal is monitored at said first end office.

7. A transmission quality monitoring system according to claim 1, wherein said first monitor means performs extraction and monitoring, as said transmission quality monitoring data, of FCS (Frame Check Sequence) bits which are mapped within the LAPD format and outside the One-Second Report area.

8. A transmission quality monitoring system as in claim 7, wherein said first monitor means includes an invalidity detection unit which, when at least one of the seven conditions,

- condition 1, in which two or more logic 1s in total are included in any of bits G1 through G6;
- condition 2, in which said LAPD format is not detected for a period of one second or longer;
- condition 3, in which said LAPD format is not retransmitted within one second after the input of an interrupt signal in said LAPD format;
- condition 4, in which either the input signal to said first end office is suspended is detected or an AIS (Alarm Indication Signal) is detected from said input signal;
- condition 5, in which, from said input signal, out-of-synchronization is detected at a main synchronizing unit;
- condition 6, in which an ESF error is detected; and
- condition 7, in which a DS1 PATH YELLOW alarm, which indicates abnormality in said input signal, is detected from a data link, is satisfied, detects the satisfying of said condition, so that an abnormality in said input signal is monitored at said first end office.

9. A transmission quality monitoring system according to claim 1, wherein said first monitor means extracts the bits G1 through G6 within the One-Second Report area as said transmission quality monitoring data, and also extracts said FCS (Frame Check Sequence) bits which are mapped within said LAPD format and outside said One-Second Report area as said transmission quality monitoring data, performing monitoring based on said transmission quality monitoring data.

10. A transmission quality monitoring system as in claim 9, wherein said first monitor means includes an invalidity detection unit which, when at least one of the seven conditions,

- condition 1, in which two or more logic 1s in total are included in any of bits G1 through G6;
- condition 2, in which said LAPD format is not detected for a period of one second or longer;
- condition 3, in which said LAPD format is not retransmitted within one second after the input of an interrupt signal in said LAPD format;
- condition 4, in which either the input signal to said first end office is suspended is detected or an AIS (Alarm Indication Signal) is detected from said input signal;
- condition 5, in which, from said input signal, out-of-synchronization is detected at a main synchronizing unit;
- condition 6, in which an ESF error is detected; and
- condition 7, in which a DS1 PATH YELLOW alarm, which indicates abnormality in said input signal, is detected from a data link, is satisfied, detects the satisfying of said condition, so that an abnormality in said input signal is monitored at said first end office.

* * * * *